(12) United States Patent
Nagano

(10) Patent No.: US 7,050,106 B2
(45) Date of Patent: May 23, 2006

(54) IMAGE INPUT DEVICE WITH ROTATABLE IMAGE PICKUP UNIT

(75) Inventor: Masatoshi Nagano, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 10/285,433

(22) Filed: Nov. 1, 2002

(65) Prior Publication Data

US 2003/0095200 A1 May 22, 2003

(30) Foreign Application Priority Data

| Nov. 21, 2001 | (JP) | ............................. 2001-356040 |
| May 10, 2002 | (JP) | ............................. 2002-135594 |
| May 10, 2002 | (JP) | ............................. 2002-135597 |

(51) Int. Cl.
*H04N 5/225* (2006.01)
*H04N 1/46* (2006.01)
*G03B 27/52* (2006.01)

(52) U.S. Cl. .................. 348/373; 348/333.01; 355/21; 358/513; 358/482

(58) Field of Classification Search .................. 348/62, 348/63, 79, 80, 112, 333.01, 333.1, 370, 373, 348/375, 376; 355/21, 70, 75, 18; D16/232; D14/423
See application file for complete search history.

(56) References Cited

U.S. PATENT DOCUMENTS

| 2,433,133 | A | * | 12/1947 | Lindsey ........................ 396/419 |
| 4,831,455 | A | * | 5/1989 | Ishikawa et al. ............. 348/373 |
| 4,939,580 | A | * | 7/1990 | Ishikawa et al. ............. 348/373 |
| 4,963,986 | A | * | 10/1990 | Fukuyama et al. .......... 348/347 |
| 5,027,219 | A | * | 6/1991 | Stuttler et al. ................ 348/96 |
| 5,247,330 | A | * | 9/1993 | Ohyama et al. ............. 348/373 |
| D358,377 | S | * | 5/1995 | Hasegawa ................... D14/423 |
| 5,444,486 | A | * | 8/1995 | Mizuno et al. .............. 348/376 |
| D376,139 | S | * | 12/1996 | Hasegawa ................... D14/423 |
| 5,751,355 | A | * | 5/1998 | Bito et al. ................... 348/375 |
| 5,764,385 | A | * | 6/1998 | Ohyama ....................... 358/498 |
| 5,929,910 | A | * | 7/1999 | Kim et al. .................... 348/373 |
| 5,947,577 | A | * | 9/1999 | Jikihara et al. ................ 355/71 |
| D419,170 | S | * | 1/2000 | Ono et al. ................... D14/423 |
| D424,091 | S | * | 5/2000 | Oh ............................... D16/232 |
| D433,683 | S | * | 11/2000 | Adachi et al. .............. D14/423 |
| 6,300,975 | B1 | * | 10/2001 | Yamane ......................... 348/63 |
| 6,317,155 | B1 | * | 11/2001 | Ohyama ....................... 348/373 |
| 6,345,763 | B1 | * | 2/2002 | Matsuda et al. ........... 250/208.1 |
| D454,570 | S | * | 3/2002 | Adachi et al. .............. D14/423 |
| 6,496,244 | B1 | * | 12/2002 | Tseng et al. ................... 355/21 |
| D494,995 | S | * | 8/2004 | Kim et al. ................... D16/232 |

(Continued)

FOREIGN PATENT DOCUMENTS

JP 63240177 A * 10/1988

(Continued)

*Primary Examiner*—David Ometz
*Assistant Examiner*—John M. Villecco
(74) *Attorney, Agent, or Firm*—Fitzpatrick, Cella, Harper & Scinto

(57) ABSTRACT

An image inputting device comprises a base having an object resting surface on which an object rests, an image pickup unit, a reflecting unit having a reflecting surface for reflecting a light from the object and introducing the light to the image pickup unit, and a holding unit disposed on the base to be rotatable about a first axis parallel to the object resting surface. The image pickup unit is rotatable about a second axis disposed on the holding unit, and the reflecting unit is rotatable about a third axis disposed on the holding unit.

15 Claims, 16 Drawing Sheets

U.S. PATENT DOCUMENTS

2003/0076441 A1* 4/2003 Maeda et al. ............... 348/375
2003/0133013 A1* 7/2003 Maeda et al. ............... 348/143
2004/0233325 A1* 11/2004 Lee et al. ................... 348/375

FOREIGN PATENT DOCUMENTS

JP          08135894 A * 5/1996

* cited by examiner

IMAGE INPUT DEVICE WITH ROTATABLE IMAGE PICKUP UNIT

BACKGROUND OF THE INVENTION

1. Field of the Invention

The present invention relates to an image inputting device for picking up an image of an object to be photographed, which is placed on a stage or base.

2. Description of the Related Art

The so-called document camera is known as an image inputting device for picking up an image of an object to be photographed, e.g., a document, placed on a stage.

A conventional document camera (image inputting device) will be described below with reference to FIGS. 17 and 18. FIG. 17 shows the document camera in a state of photographing a document, and FIG. 18 shows the document camera during a collapsing, or folding, step.

In those drawings, a document stage 102 is formed on a document stage unit 101, and a document 102a is placed on the document stage 102. A control panel 103 manipulated for instructing the operation of the document camera is made up of electrical switches, etc.

A rotary shaft 105a is provided at a base end of a lower camera arm 105. The lower camera arm 105 is held on the document stage unit 101 such that it is rotatable about the rotary shaft 105a in a direction of an arrow L in FIG. 17.

An upper camera arm 106 is axially telescopically coupled to the lower camera arm 105.

An image pickup unit 107 is mounted to a fore end of the upper camera arm 106. A photographing lens 108 is disposed in the image pickup unit 107 for taking an image of the document 102a. The image pickup unit 107 is supported by a shaft provided at a fore end of the upper camera arm 106 such that it is rotatable about the shaft in a direction of an arrow J in FIG. 17.

A right illumination unit 109 is mounted to a right illumination arm 110, and a fluorescent lamp 109a is attached to the right illumination unit 109. The right illumination arm 110 is held on the document stage unit 101 such that it is rotatable in a direction of an arrow N in FIG. 17.

Also, the right illumination unit 109 is supported by the right illumination arm 110 such that it is rotatable in a direction of an arrow Q in FIG. 17.

A left illumination unit 111 is mounted to a left illumination arm 112, and a fluorescent lamp 111a is attached to the left illumination unit 111. The left illumination arm 112 is held on the document stage unit 101 such that it is rotatable in a direction of an arrow M in FIG. 17. Also, the left illumination unit 111 is supported by the left illumination unit 112 such that it is rotatable in a direction of an arrow R in FIG. 17.

An unlocking lever 113 unlocks a locking mechanism (not shown) for locking the lower camera arm 105 to the document stage unit 101. By moving the unlocking lever 113 in a direction of an arrow O in FIG. 17, the locking mechanism is unlocked from the lower camera arm 105.

How to take an image of the document 102a with the document camera is now described. In the photographing state, as shown in FIG. 17, the photographing lens 108 is positioned right above the document stage 102 to face exactly downward. As a result, the image pickup unit 107 holding the photographing lens 108 is also properly positioned.

A photoelectric transducer (not shown), such as a CCD, is disposed in the image pickup unit 107 at a focused position of the photographing lens 108, and an electrical signal output from the photoelectric transducer is converted to an image signal by a control circuit (not shown). Then, the image signal is output to an image display unit (not shown), such as a projector, which is electrically connected to the document camera.

Further, in the state shown in FIG. 17, an illumination level of the document 102a can be adjusted by rotating the right illumination unit 109 and the left illumination unit 111 respectively in the directions of the arrows Q, R in FIG. 17.

A manner of collapsing the document camera will now be described. When collapsing the document camera from the state (photographing state) shown in FIG. 17, the image pickup unit 107 is first rotated in the direction of the arrow J in FIG. 17. Then, by pushing the upper camera arm 106 into the lower camera arm 105 (in a direction of an arrow K), the overall length of the camera arm is shortened so that the image pickup unit 107 moves closer to the document stage 102. Subsequently, the unlocking lever 113 is moved in the direction of the arrow O to unlock the lower camera arm 105 from the document stage unit 101. The lower camera arm 105 is rotated about the rotary shaft 105a in the direction of the arrow L, causing the image pickup unit 107 to lie over the document stage 102.

At a position just before the image pickup unit 107 comes into contact with the document stage unit 101, the positional relationship between the image pickup unit 107 and the document stage unit 101 is automatically fixed again. Further, by moving the unlocking lever 113 in the direction of the arrow O in the fixed state, that fixed state is released, whereupon the lower camera arm 105, i.e., the image pickup unit 107, is allowed to move relative to the document stage unit 101.

Next, the left illumination arm 112 is rotated in the direction of the arrow M, and the left illumination unit 111 is rotated in the direction of the arrow R, as shown FIG. 18. A resulting folded-up state is shown FIG. 18.

Then, the right illumination arm 110 and the right illumination unit 109 are rotated in the direction of the arrow N from the above-mentioned state. Thereafter, the right illumination unit 109 is rotated in the direction of the arrow Q so that the volume of the document camera in its collapsed state is further reduced. In this way, the left and right illumination units are folded and the document camera is brought into a collapsed state (not shown).

The operation of unfolding the document camera from the collapsed state to the photographing state is carried out by reversing the above-described operation of folding the document camera from the photographing state to the collapsed state.

However, the conventional document camera has a relatively low mechanical strength in its collapsed state. More specifically, because the image pickup unit 107, the left and right illumination units 109, 111 (in particular fluorescent lamps 109a, 111a), and the control panel 103 are exposed to the exterior, there is a risk that the image pickup unit 107, the left and right illumination units 109, 111, and the control panel 103 may be damaged in the collapsed state of the document camera upon accidental impacts applied to any of those components. Another problem is that the photographing lens 108 is more easily susceptible to flaws and contaminations.

Those problems can be avoided or relieved by placing a protective cover so as to cover the overall upper surface of the document camera, and/or by fitting a lens cap to the photographing lens 108. However, the necessity of such a dedicated protective member is disadvantageous in that the structure of the document camera is more complicated and the number of extra parts is increased.

Also, in the conventional document camera, since the upper camera arm 106 is telescopically pushed into the lower camera arm 105 for contraction, an electrical signal line (not shown) passing through both the camera arms 105, 106 for electrical connection between the image pickup unit 107 and the document stage unit 101 must be wired with such a sufficient allowance as causing the line to loosely slack in the collapsed state. In that situation, there is a risk that the electrical signal line is more likely to break with repeated operations of extending and contracting the upper camera arm 106 and the lower camera arm 105.

If the upper camera arm 106 and the lower camera arm 105 are constructed as a one-piece camera arm to prevent the above-mentioned problem, the image pickup unit 107 would project out of the document stage unit 101 (for example, forward of the control panel 103) when the document camera is in the collapsed state. This would result in the problems that the document camera in the collapsed state has a larger size and the document camera is more easily susceptible to a failure because external impacts are more likely to impose on the image pickup unit 107, which has a relatively low mechanical strength, when the document camera is in the collapsed state.

In the above case, to prevent the image pickup unit 107 from projecting out of the front portion (control panel 103) of the document stage unit 101, the size of the document stage unit 101 must be further increased.

Moreover, since the document resting surface of the document stage 102 is exposed to the exterior in the collapsed state of the document camera, the document resting surface is susceptible to contaminations.

SUMMARY OF THE INVENTION

It is, therefore, an object of the present invention to provide an image inputting device, which has superior operability to a conventional one, has a simpler construction, takes an integrally overlapped and robust form in its collapsed state, and has an increased mechanical strength with higher reliability.

To achieve the above object, an image inputting device according to the present invention comprises a base having an object resting surface on which an object is rested; an image pickup unit; a reflecting unit having a reflecting surface for reflecting a light from the object and introducing the light to the image pickup unit; and a holding unit disposed on the base to be rotatable about a first axis parallel to the object resting surface. The image pickup unit is rotatable about a second axis disposed on the holding unit, and the reflecting unit is rotatable about a third axis disposed on the holding unit.

In the image inputting device of the present invention, preferably, the second axis and the third axis are parallel to each other.

In the image inputting device of the present invention, preferably, the first axis, the second axis and the third axis are parallel to each other.

In the image inputting device of the present invention, preferably, the holding unit has a first holding space for holding the reflecting unit, and when the holding unit is rotated to be substantially parallel to the object resting surface of the base with the reflecting unit held in the first holding space of the holding unit, the reflecting unit is positioned substantially parallel to the object resting surface.

In the image inputting device of the present invention, preferably, the holding unit has a second holding space for holding the image pickup unit, and when the holding unit is rotated to be substantially parallel to the object resting surface of the base with the image pickup unit held in the second holding space of the holding unit, an optical axis of the image pickup unit is positioned substantially parallel to the object resting surface.

In the image inputting device of the present invention, preferably, the image pickup unit includes an illumination section for illuminating the object resting surface. In this case, the illumination section illuminates the object resting surface from the outer side of an outermost light of a light flux that is incident upon and reflected by the object resting surface and then introduced to the image pickup unit after being reflected by the reflecting surface.

Preferably, the image inputting device of the present invention further comprises an illumination unit for illuminating the object resting surface, wherein the illumination unit is disposed rotatably about a fourth axis disposed on the holding unit. In this case, the fourth axis is parallel to the first axis.

Preferably, the image inputting device of the present invention further comprises a flat display, wherein the flat display is fixed integrally with the reflecting unit.

Preferably, the image inputting device of the present invention further comprises a flat display, wherein the flat display is disposed rotatably about a fifth axis disposed on the reflecting unit.

Preferably, the image inputting device of the present invention further comprises a control panel disposed on the base for operating the image inputting device, wherein the control panel is covered with the holding unit when the holding unit is rotated to be substantially parallel to the object resting surface of the base.

Further objects, features and advantages of the present invention, including practical applications thereof, will become apparent from the following description of the preferred embodiments with reference to the attached drawings.

DESCRIPTION OF THE PREFERRED EMBODIMENTS

First Embodiment

Figure 1:
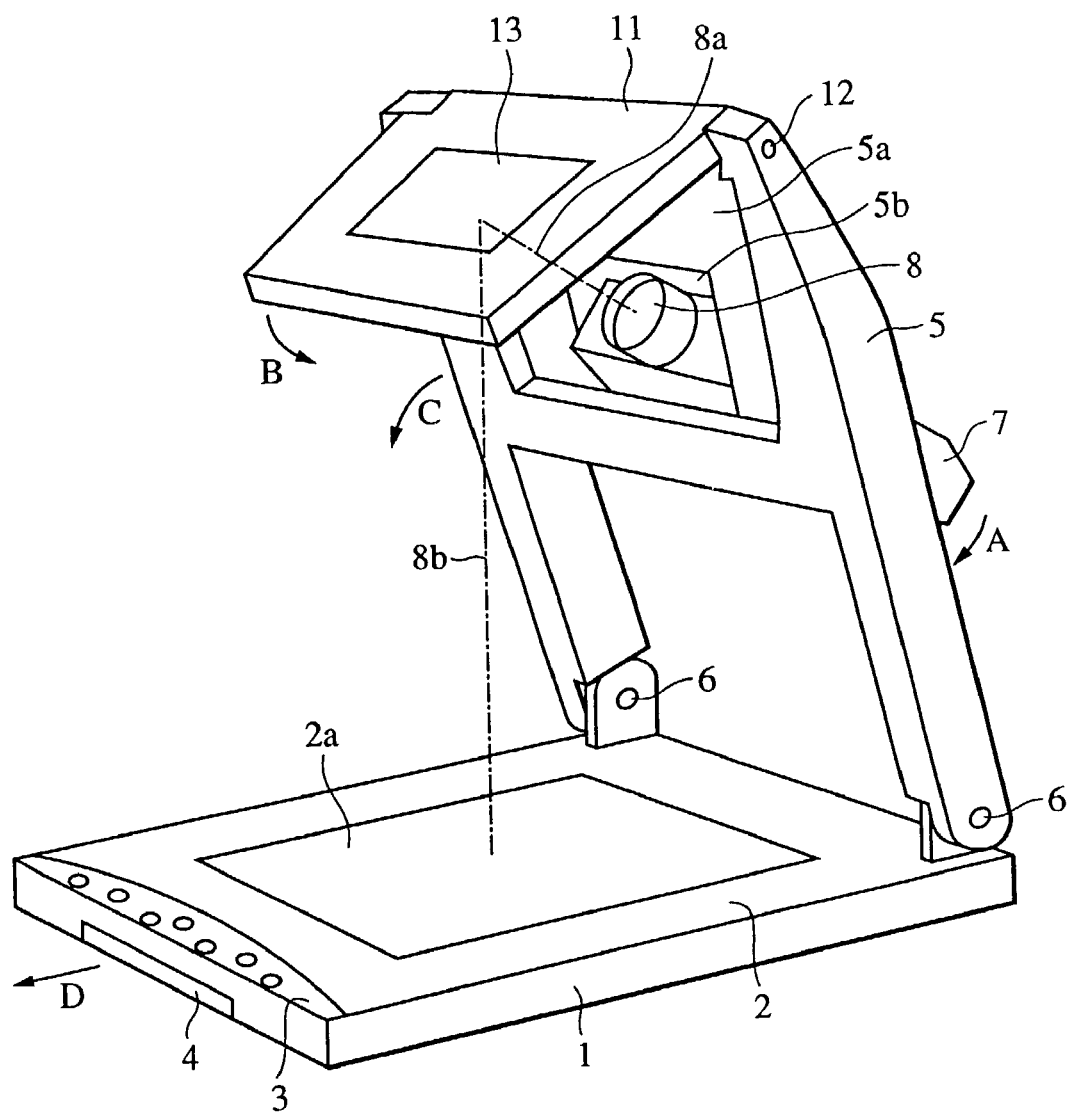
FIG. 1 is a perspective view of an image inputting device according to a first embodiment of the present invention in its photographing state.
Figure 2:
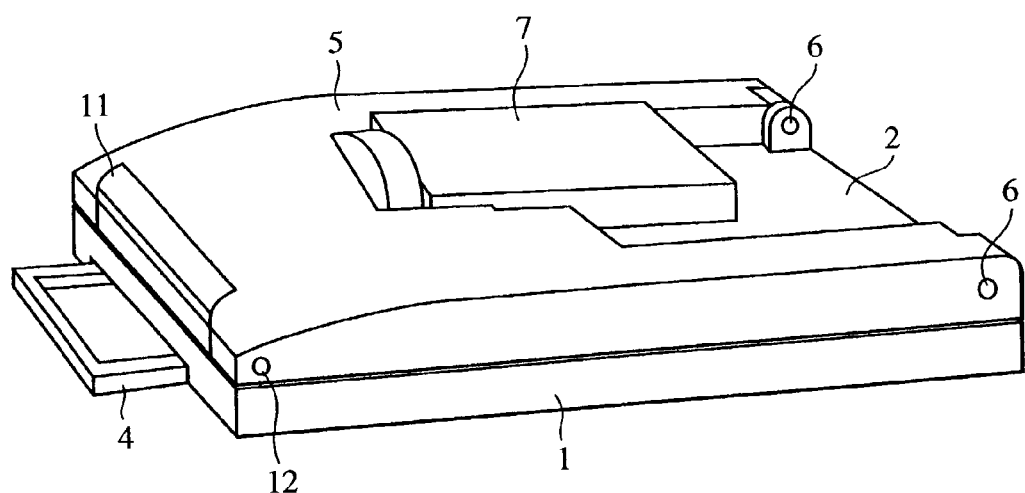
FIG. 2 is a perspective view of the image inputting device according to the first embodiment in its collapsed state.
Figure 3:
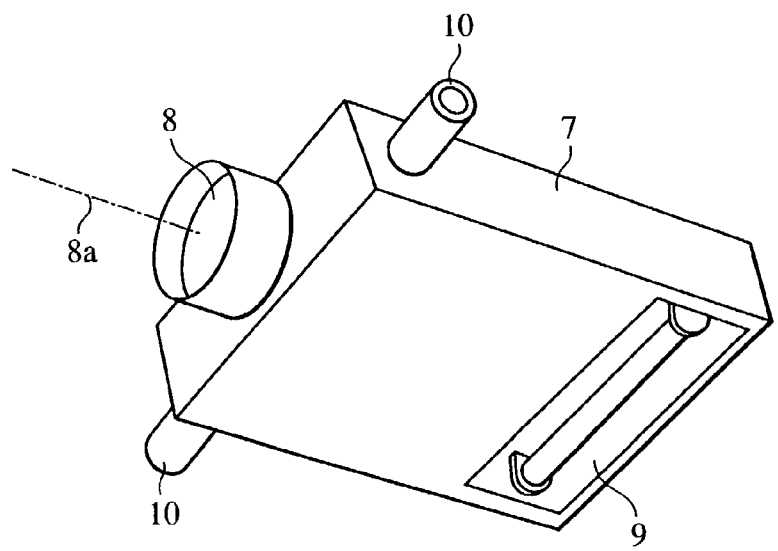
FIG. 3 is a perspective view of an image pickup unit of the image inputting device according to the first embodiment.
Figure 4:
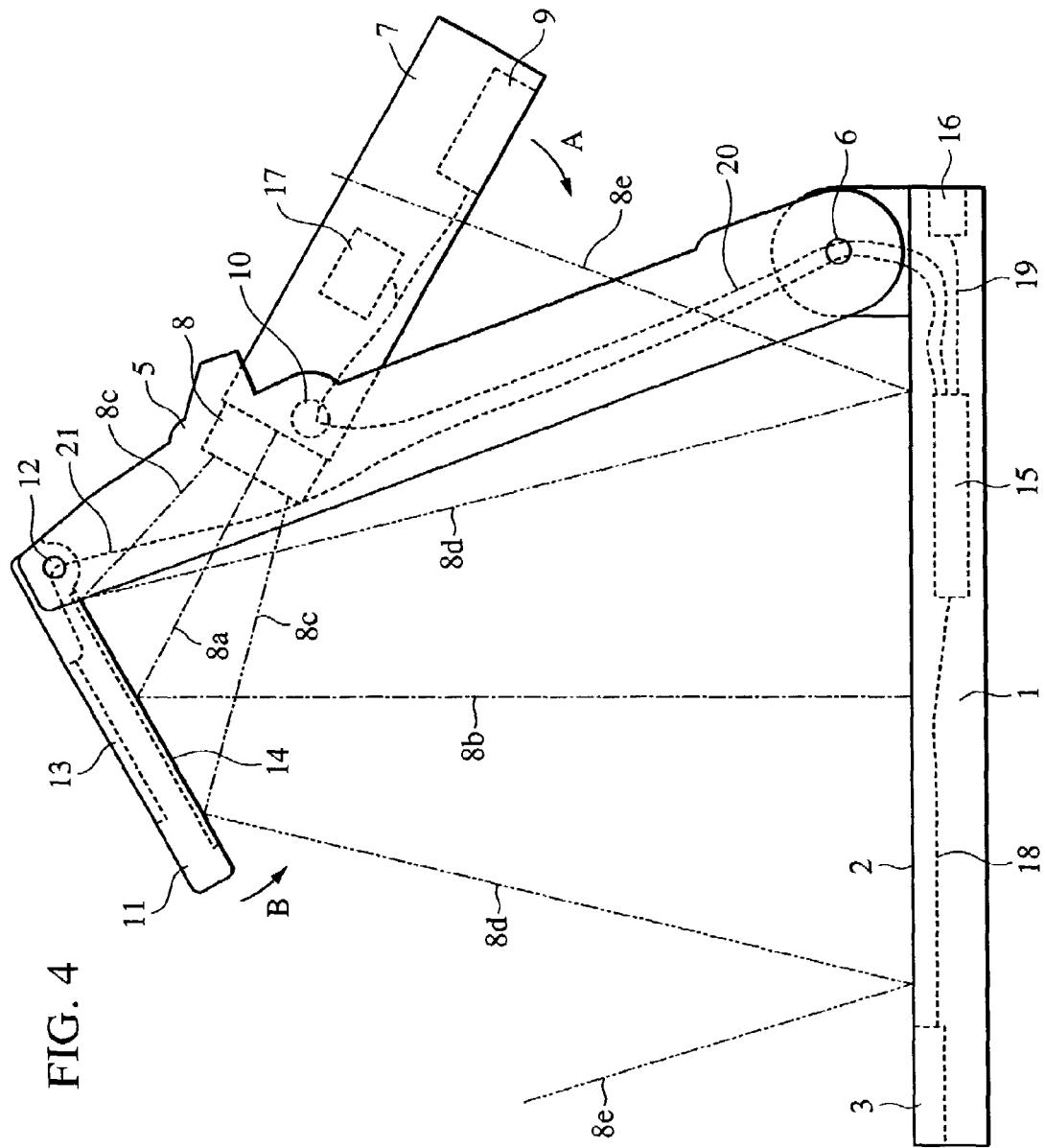
FIG. 4 is a side view of the image inputting device according to the first embodiment in the photographing state.
Figure 5:
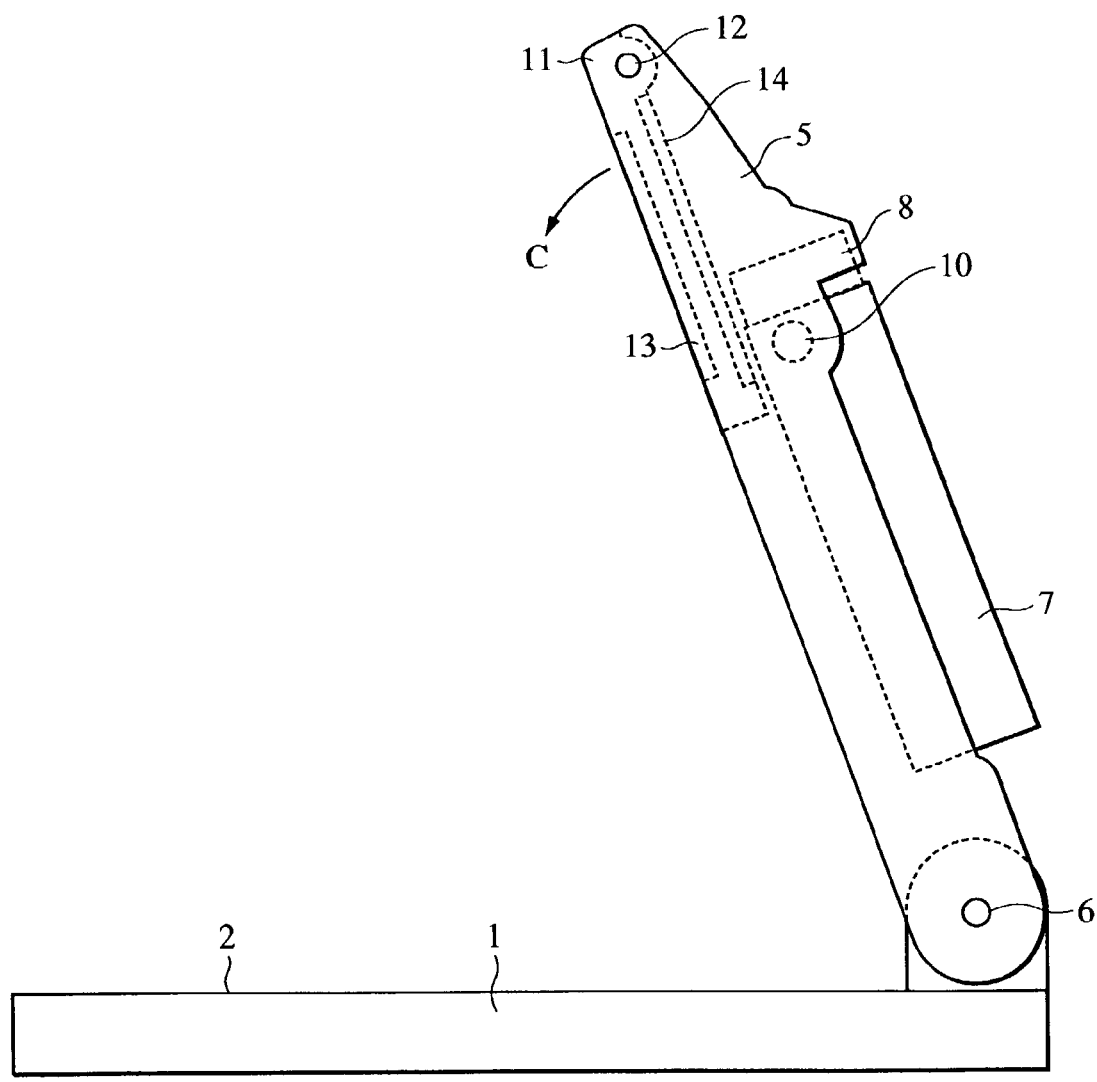
FIG. 5 is a side view of the image inputting device according to the first embodiment during a shift from the photographing state to the collapsed state.
Figure 6:
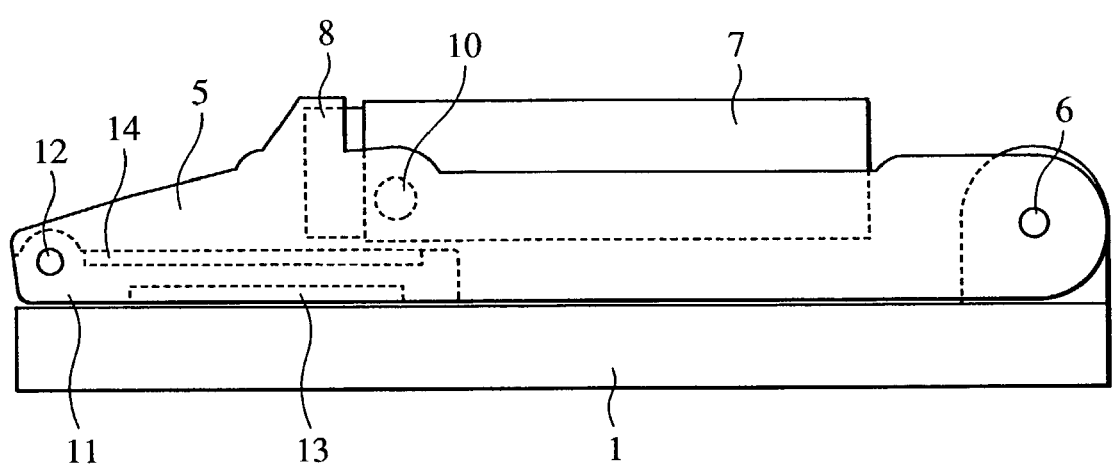
FIG. 6 is a side view of the image inputting device according to the first embodiment in the collapsed state.

FIGS. 1 to 6 show a construction of an image inputting device (document camera) according to a first embodiment of the present invention. FIGS. 1 and 4 show the image inputting device in its photographing state. FIGS. 2 and 6 show the image inputting device in its collapsed (folded-up) state. FIG. 3 shows an image pickup unit of the image inputting device. FIG. 5 shows the image inputting device during a shift from the photographing state to the collapsed (folded-up) state.

The first embodiment of the present invention will be described below with reference to FIGS. 1 to 6. In these drawings, a document resting surface 2 is formed on a document stage unit (base) 1, and a document (object to be photographed) 2a is placed on the document resting surface 2.

A control panel (console) 3 manipulated for instructing the operation of the image inputting device is made up of electrical switches, etc. and is disposed on an upper surface of the document stage unit 1 in its front portion.

A handle 4 gripped by a user for carrying the image inputting device can be inserted into the front end portion of the document stage unit 1 and withdrawn up to a predetermined position in a direction of an arrow D in FIG. 1. FIG. 2 shows a state in which the handle 4 is withdrawn.

A movable holding unit 5 is rotatably held at its base end to a rear end portion of the document stage unit 1 by a pair of rotary shafts 6 extending substantially parallel to the document resting surface 2. With such an arrangement, the movable holding unit 5 is rotatable relative to the document stage unit 1 between the unfolded state (photographing state) shown in FIG. 1 and the collapsed state (folded-up state) shown in FIG. 2. Further, a shallow recess 5a and a penetration hole 5b each serving as an accommodating (holding) space are formed in the movable holding unit 5 in its portion nearer to the fore end thereof.

An image pickup unit 7 is formed and disposed to be able to fit into the penetration hole 5b, serving as an accommodating space, of the movable holding unit 5. A photographing lens 8 for taking an image of the document 2a is disposed on the image pickup unit 7. Numeral 8a denotes an optical axis of the photographing lens 8, and numeral 8b denotes an optical axis of a light flux that advances from the document resting surface 2 and is bent upon reflection at a later-described reflecting mirror 14 (shown in FIG. 4) to be aligned with the optical axis 8a of the image pickup unit 7.

Also, as shown in FIG. 4, numeral 8c denotes an outermost light of the light flux entering the photographing lens 8 from the reflecting mirror 14, and numeral 8d denotes a light that advances from the document resting surface 2 to the reflecting mirror 14 and then becomes the light 8c.

Further, numeral 8e denotes a light that is included in a light flux entering the document resting surface 2 and becomes the light 8d after being reflected by the document resting surface 2. In other words, it denotes an outermost light of the light flux that is incident upon the document resting surface 2, reflected by the document resting surface 2 (or the document 2a), and then introduced to the photographing lens 8 after being reflected by the reflecting mirror 14.

A document illumination unit 9 is disposed in a bottom surface of the image pickup unit 7 on the side opposed to the photographing lens 8. A pair of rotary shafts 10 are provided on the image pickup unit 7 and are extended substantially parallel to the document resting surface 2. With the rotary shafts 10, the image pickup unit 7 is held on the movable holding unit 5 in a rotatable manner (such that the image pickup unit 7 can be unfolded and collapsed relative to the movable holding unit 5).

A numeral 11 denotes a mirror unit. A pair of rotary shafts 12 are provided on the mirror unit 11 and are extended substantially parallel to the document resting surface 2. With the rotary shafts 12, the mirror unit 11 is held on the movable holding unit 5 in a rotatable manner (such that the mirror unit 11 can be unfolded and collapsed relative to the movable holding unit 5). Additionally, the rotary shafts 6, the rotary shafts 10, and the rotary shafts 12 are extended substantially parallel to each other.

A display panel 13 is constituted as a flat display made up of liquid crystal display devices, etc. The display panel 13 displays, e.g., an image picked up by the image pickup unit 7 and a menu screen for operation of the image inputting device. The contents displayed on the display panel 13 are switched over with manipulation made on the control panel 3 in an electrical manner.

The reflecting mirror 14 is disposed on a back surface (i.e., surface opposed to the surface on which the display panel 13 is disposed) of the mirror unit 11, and the light flux from the document side to the photographing lens 8 after reflecting the light flux once when the image inputting device is in the photographing state.

The image inputting device having the above-described construction is set to the photographing state, as shown in FIGS. 1 and 4, by unfolding the movable holding unit 5 upward relative to the document stage unit 1, unfolding the image pickup unit 7 rearward relative to the movable holding unit 5, and then unfolding the mirror unit 11 forward relative to the movable holding unit 5. In the resulted photographing state, the light from the document 2a, which is placed on the document resting surface 2 and illuminated by the document illumination unit 9, is introduced to the photographing lens 8 after being reflected by the reflecting mirror 14 and passing through the penetration hole 5b of the movable holding unit 5.

Referring to FIG. 4, the image inputting device includes a main control circuit 15 disposed in the document stage unit 1, a contact unit 16 for supply of a source power from the external and outputting of an image signal to external equipment connected to the image inputting device, and an image pickup control circuit 17 for controlling a photoelectric transducer or an image pickup device (not shown), such as a CCD. It further includes an electrical signal line 18 for electrically connecting the main control circuit 15 and the control panel 3, an electrical signal line 19 for electrically connecting the main control circuit 15 and the contact unit 16, an electrical signal line 20 for electrically connecting the main control circuit 15 to both the image pickup control circuit 17 and the document illumination unit 9, and an electrical signal line 21 for electrically connecting the main control circuit 15 and the display panel 13.

The electrical signal line 20 passes the respective centers of the rotary shafts 6 and 10 or the vicinity thereof for electrical connection of the main control circuit 15 to both the document illumination unit 9 and the image pickup control circuit 17. Also, the electrical signal line 21 passes the respective centers of the rotary shafts 6 and 12 or the vicinity thereof for electrical connection between the main control circuit 15 and the display panel 13.

Further, the image inputting device includes a locking mechanism (not shown) for fixedly locking the movable holding unit 5 relative to the document stage unit 1 in both the photographing state and the collapsed state (folded-up state), and an unlocking mechanism (not shown) for releasing the movable holding unit 5 from its locked state. In addition, the image inputting device includes a locking mechanism (not shown) for fixedly locking the image pickup unit 7 relative to the movable holding unit 5 in both the photographing state and the collapsed state (folded-up state), and an unlocking mechanism (not shown) for releasing the image pickup unit 7 from its locked state.

Moreover, the image inputting device includes a locking mechanism (not shown) for fixedly locking the mirror unit 11 relative to the movable holding unit 5 in both the photographing state and the collapsed state (folded-up state), and an unlocking mechanism (not shown) for releasing the mirror unit 11 from its locked state.

The operation of the image inputting device in the photographing state is now described. As stated above, the light from the document 2a placed on the document resting surface 2 is introduced to the photographing lens 8 via the reflecting mirror 14. An electrical signal output from the photoelectric transducer (image pickup device), which is disposed in the image pickup unit 7 at a focused position of the photographing lens 8, is converted to an image signal by the image pickup control circuit 17. Then, the image signal is inverted upside down with a predetermined data array conversion process executed in the image pickup control circuit 17 because the image signal is obtained by picking up the light after being reflected by one reflecting mirror 14. Thereafter, the image signal inverted upside down is sent to the main control circuit 15 in the document stage unit 1 via the electrical signal line 20.

Note that the process of converting the image signal upside down corresponding to the image inversion by the reflecting mirror may be executed in any other circuit, e.g., the main control circuit 15, than the image pickup control circuit 17.

The image signal inverted upside down is output from the main control circuit 15 to an image display (not shown), such as a projector, which is electrically connected to the image inputting device, through the electrical signal line 19 and the contact unit 16. Also, the image signal is transmitted to the display panel 13 through the electrical signal line 21, whereby the picked-up image is displayed on the display panel 13.

Since the display panel 13 is disposed on the front surface (i.e., surface opposed to the back surface on which the reflecting mirror 14 is disposed) of the mirror unit 11, a user operating the image inputting device is able to replace the document 2a from the side of the control panel 3 and to manipulate the control panel 3. Further, the user is able to look at the contents displayed on the display panel 13 from the side of the control panel 3.

The contents displayed on the display panel 13 are not limited to images picked up by the image pickup unit 7. For example, a test pattern for checking the quality, such as contrast and hue, of an image output to the exterior may also be displayed on the display panel 13.

Since the display panel 13 is disposed on the mirror unit 11, there is no need of providing a holding member dedicated for the display panel 13 separately from the mirror unit 11. As a result, the construction of the image inputting device is simplified correspondingly.

As shown in FIGS. 3 and 4, when the image inputting device of this embodiment is in the photographing state, the image pickup unit 7 is unfolded such that the document illumination unit 9 obliquely directly illuminates the document resting surface 2 from the outer side (side farther away from the optical axis 8b) of the light 8e without intermediation of the reflecting mirror 14. Accordingly, even when the document 2a is a glossy document (reflective one), such as a photo, a light flux forming a light source image of the document illumination unit 9 will not enter the photographing lens 8. Hence, the light source image of the document illumination unit 9 is surely prevented from being superimposed on the image of the document 2a.

Supposing that the document illumination unit 9 is located in the inner side (side closer to the optical axis 8b) of the light 8e, when the document 2a is a reflective one, the illumination light is reflected by the document 2a and enters the photographing lens 8. As a result, a high-quality photographed image could not be obtained.

Further, in this embodiment, since the document illumination unit 9 is constructed integrally with the image pickup unit 7, there is no need of providing a holding member dedicated for the document illumination unit 9 separately from the image pickup unit 7. As a result, the construction of the image inputting device can be further simplified.

Moreover, the electrical signal line extended from the main control circuit 15 to the document illumination unit 9 and the electrical signal line extended from the main control circuit 15 to the image pickup control circuit 17 can be wired as a common line.

Still further, since the document illumination unit 9 is located on the side opposed to the control panel 3, a relatively large space is left on the control panel 3 side and the document illumination unit 9 is kept from imposing a physical obstacle when the document 2a is replaced or when the control panel 3 is manipulated. In other word, the user operating the image inputting device can replace the document 2a and manipulate the control panel 3 without interfering with the document illumination unit 9.

Additionally, since the document illumination unit 9 directly illuminates the document resting surface 2 from an obliquely upward position without intermediation of the reflecting mirror 14, the light from the document illumination unit 9 as the light source is prevented from directly entering the user's eyes. Therefore, the user can operate the image inputting device without feeling dazzled.

The operation of shifting the image inputting device from the photographing state to the collapsed state (folded-up state) will be described below. First, when the image inputting device is in the photographing state shown in FIGS. 1 and 4, the unlocking mechanism (not shown) for the image pickup unit 7 is operated to release the image pickup unit 7 from the locked state, and the image pickup unit 7 is rotated in a direction of an arrow A in the drawings to be accommodated in the movable holding unit 5 such that the optical axis of the image pickup unit 7 is positioned substantially parallel to the movable holding unit 5. Then, the image pickup unit 7 is locked again with the locking mechanism (not shown) relative to the movable holding unit 5.

In that condition, the photographing lens 8 is positioned in the penetration hole 5*b* serving as an accommodating space and is covered with the movable holding unit 5. Therefore, when the image inputting device is in the collapsed state (folded-up state), the photographing lens 8 can be protected with no need of fitting a lens protective member, such as a lens cap, to the photographing lens 8.

Then, the unlocking mechanism (not shown) for the mirror unit 11 is operated to release the mirror unit 11 from the locked state, and the mirror unit 11 is rotated in a direction of an arrow B in the drawings to be accommodated in the recess 5*a*, serving as an accommodating space, of the movable holding unit 5. At this time, the mirror unit 11 is positioned substantially parallel to the movable holding unit 5. Thereafter, the mirror unit 11 is locked again with the locking mechanism (not shown) relative to the movable holding unit 5. A resulting condition is shown in FIG. 5.

Further, the unlocking mechanism (not shown) for the movable holding unit 5 is operated to release the movable holding unit 5 from the locked state, and the movable holding unit 5 is rotated in a direction of an arrow C in FIG. 5 to be folded relative to the document stage unit 1 until reaching a position where the movable holding unit 5 is substantially parallel to the document stage unit 1. Then, the movable holding unit 5 is locked again with the locking mechanism (not shown) relative to the document stage unit 1.

As seen from FIGS. 5 and 6, in the collapsed state (folded-up state) thus obtained, a part of the mirror unit 11 overlaps with a part of the image pickup unit 7 in a thickness direction of both the movable holding unit 5 and the document stage unit 1.

In the collapsed state, therefore, the mirror unit 11 and the image pickup unit 7 can be folded up relative to the movable holding unit 5 and the document stage unit 1 into a compact size without interfering with each other.

Also, the reflecting mirror 14 is covered with one surface of the movable holding unit 5 corresponding to the bottom surface (ceiling surface in the condition of FIG. 6) of the recess 5*a* formed in the movable holding unit 5, and the display panel 13 is positioned in a closely opposing relation to the upper surface of the document stage unit 1. Accordingly, when the image inputting device is in the collapsed state, the reflecting mirror 14 and the display panel 13 can be protected with no need of fitting a protective member, e.g., a protective cover, to the mirror unit 11 (i.e., the reflecting mirror 14 and the display panel 13).

Further, in the collapsed state (folded-up state), the document illumination unit 9 disposed on the image pickup unit 7 is also positioned in a closely opposing relation to the upper surface of the document stage unit 1. Accordingly, the document illumination unit 9 can be protected with no need of fitting a protective member, e.g., a protective cover, to it.

Moreover, the upper surface of the control panel 3 is covered with the movable holding unit 5 and the mirror unit 11 which are folded up relative to the document stage unit 1. Accordingly, the control panel 3 can also be protected with no need of fitting a protective member, e.g., a protective cover, to it.

In addition, the upper surface of the document stage unit 1 is covered at its three outer peripheries, i.e., front, left and right ones, with the movable holding unit 5. Therefore, the image inputting device has such a structure in the collapsed state that the document resting surface 2 is less susceptible to damage upon being hit by things or to contamination.

The operation of shifting the image inputting device from the collapsed state to the photographing state is carried out by reversing the above-described operation of shifting the image inputting device from the photographing state to the collapsed state.

Thus, when the image inputting device is in the collapsed state, the movable holding unit 5 functions as a protective member for protecting the photographing lens 8, the document illumination unit 9, the mirror unit 11, the display panel 13 and the control panel 3, i.e., components which have in general a relatively low mechanical strength. Accordingly, there is no need of fitting protective members dedicated for the photographing lens 8, the document illumination unit 9, the mirror unit 11, the display panel 13 and the control panel 3. Hence, the number of parts required for the image inputting device in the collapsed state can be reduced. Additionally, as shown in FIGS. 2 and 6, the image inputting device of this embodiment has an integrally overlapped and robust structure in the collapsed state as a whole. As a result, an image inputting device with a high mechanical strength and high reliability can be provided.

Further, in this embodiment, the movable holding unit 5 is rotatably supported by the document stage unit 1 through the rotary shafts 6, and the image pickup unit 7 and the mirror unit 11 are rotatably supported by the movable holding unit 5 through the rotary shafts 10 and 12, respectively. Accordingly, there is no need of leaving the electrical signal lines in a loosely slacked condition near engaging portions of the adjacent component units unlike the conventional case using a telescoping mechanism.

Moreover, during the step of shifting the image inputting device from the photographing state to the collapsed state and the step of shifting it from the collapsed state to the photographing state, the electrical signal lines are kept from displacing far away from the vicinity of the rotary shafts 6, 10 and 12. Accordingly, the possibility of breakage and connection failures of the electrical signal lines 20, 21 is greatly reduced, and the reliability of the image inputting device can be increased.

Since the rotary shafts 6, 10 and 12 are disposed substantially parallel to each other, the image inputting device can be shifted between the photographing state and the collapsed state by rotating the movable holding unit 5, the image pickup unit 7 and the mirror unit 11 in the same plane of rotation. Therefore, the rotating directions of the respective component units are consistent and the operability of the image inputting device can be improved.

FIG. 2 shows a condition in which the handle 4 provided adjacent to the control panel 3 is withdrawn in the collapsed state of the image inputting device shown in FIG. 6. Thus, with the provision of the handle 4 adjacent to the control panel 3 in the image inputting device of this embodiment, the user can easily carry the image inputting device by gripping the handle 4 withdrawn as shown in FIG. 2.

This embodiment may be modified such that at least the image pickup unit 7 and the mirror unit 11 are rotated in a linked manner relative to the movable holding unit 5 using a linkage mechanism such as a timing belt. With this modification, the locking mechanism and the unlocking mechanism for locking and unlocking the image pickup unit 7 and the mirror unit 11 relative to the movable holding unit 5 can be provided in common. Also, since the image pickup unit 7 and the mirror unit 11 are rotated (unfolded and collapsed) together at the same time, the operation of shifting the image inputting device from the photographing state to the collapsed state and the operation of shifting it from the collapsed state to the photographing state are more simplified and an error in the operating procedure is less likely to occur. Consequently, the operability of the image inputting device can be further improved.

As an alternative, by linking not only the rotations of the image pickup unit 7 and the mirror unit 11, but also the rotation of the movable holding unit 5 relative to the document stage unit 1, the locking mechanism and the unlocking mechanism for locking and unlocking the image pickup unit 7, the mirror unit 11 and the movable holding unit 5 can be provided in common. Consequently, the operability of the image inputting device can be even further improved.

Second Embodiment

Figure 7:
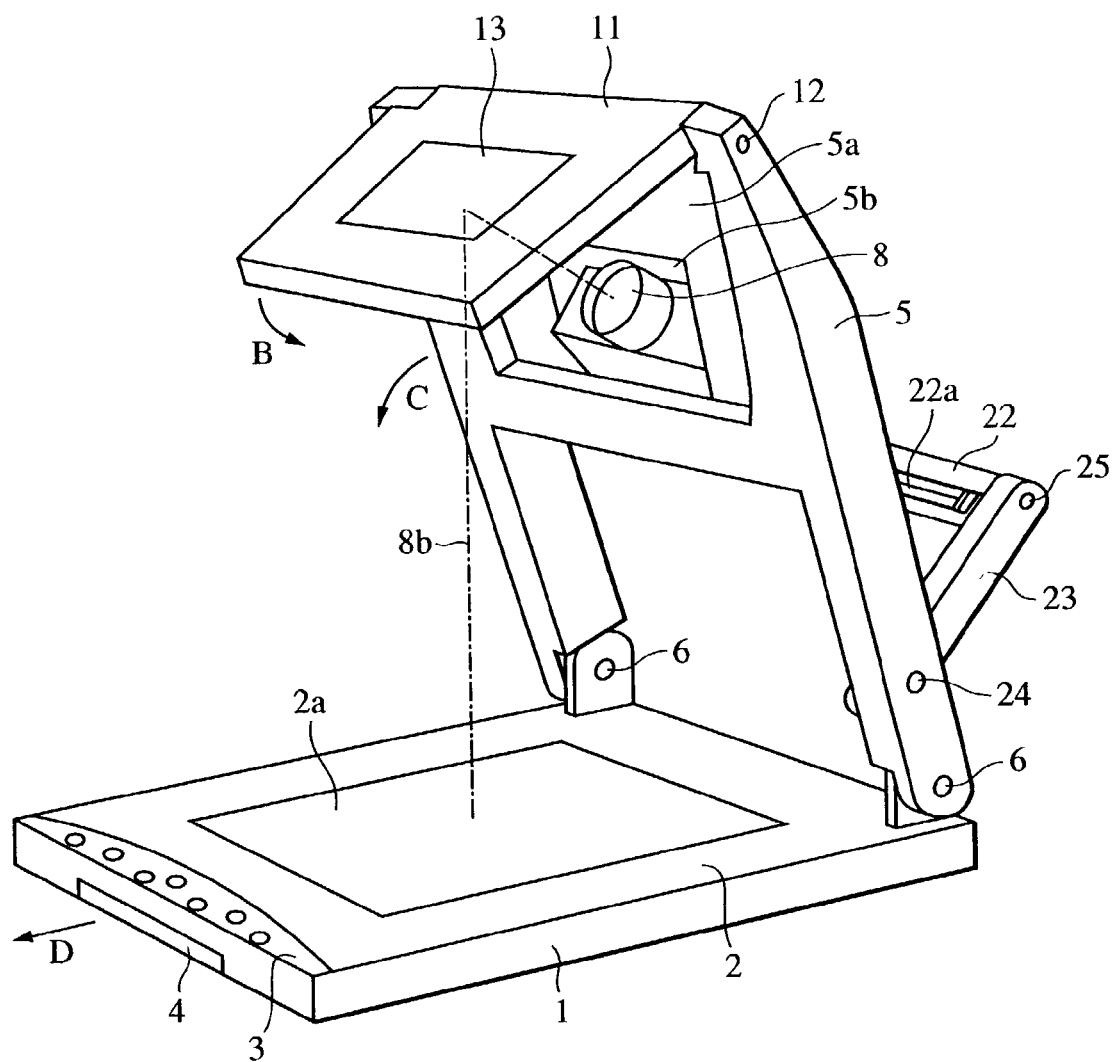
FIG. 7 is a perspective view of an image inputting device according to a second embodiment of the present invention in its photographing state.
Figure 8:
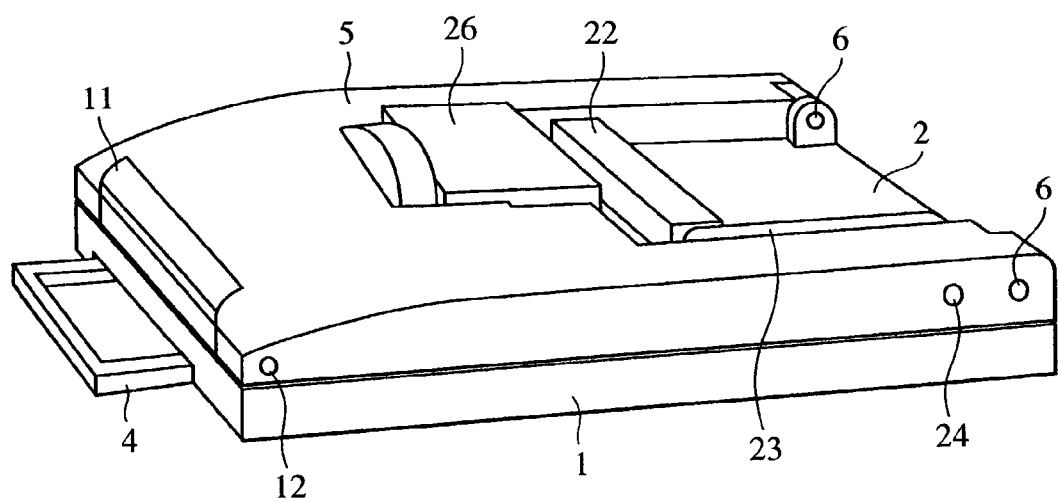
FIG. 8 is a perspective view of the image inputting device according to the second embodiment in its collapsed state.
Figure 9:
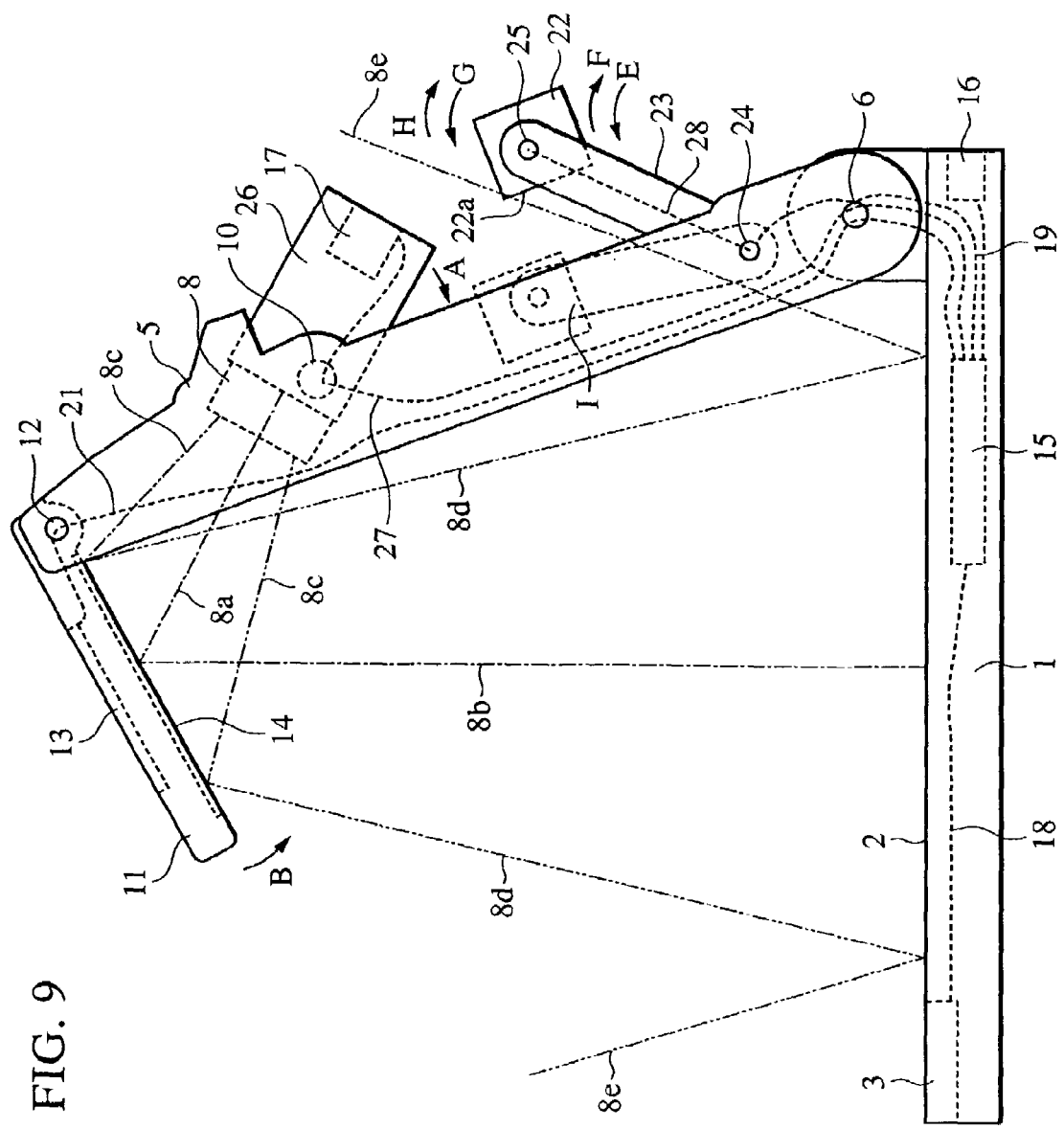
FIG. 9 is a side view of the image inputting device according to the second embodiment in the photographing state.
Figure 10:
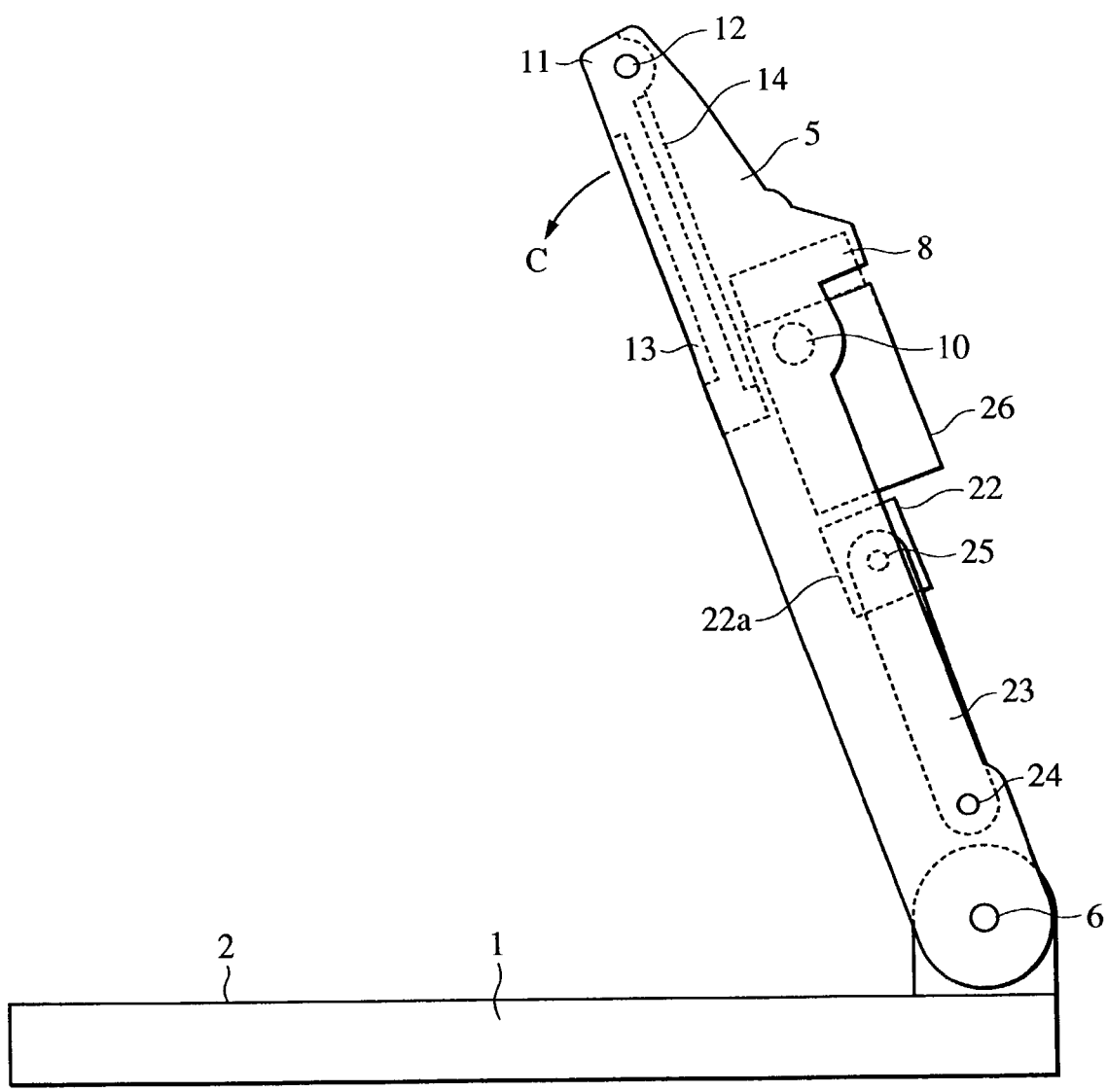
FIG. 10 is a side view of the image inputting device according to the second embodiment during a shift from the photographing state to the collapsed state.
Figure 11:
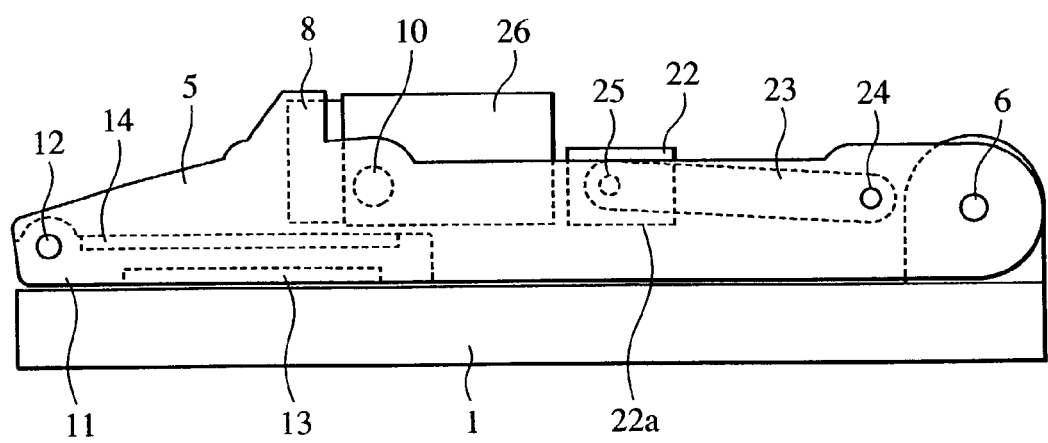
FIG. 11 is a side view of the image inputting device according to the second embodiment in the collapsed state.

FIGS. 7 to 11 show an image inputting device (document camera) according to a second embodiment of the present invention. FIGS. 7 and 9 show the image inputting device in its photographing state. FIGS. 8 and 11 show the image inputting device in its collapsed (folded-up) state. FIG. 10 shows the image inputting device during a shift from the photographing state to the collapsed (folded-up) state.

Note that, in this second embodiment described with reference to FIGS. 7 to 11, components in common to the first embodiment described above with reference to FIGS. 1 to 6 are denoted by the same symbols as those in the first embodiment.

While the document illumination unit 9 is integrally provided with the image pickup unit 7 in the above-described first embodiment, a document illumination unit 22 is mounted to the movable holding unit 5 in an unfolding and collapsing manner separately from the image pickup unit 7.

In FIGS. 7 to 11, the document illumination unit 22 has a light projecting surface 22a, and a pair of illumination arms 23 hold the document illumination unit 22. A pair of rotary shafts 24 are disposed at respective base ends of the illumination arms 23 to lie substantially parallel to the document resting surface 2, and support the illumination arms 23 on the movable holding unit 5 in a rotatable manner.

A pair of rotary shafts 25 are disposed at both ends of the document illumination unit 22 to lie substantially parallel to the document resting surface 2, and support the document illumination unit 22 on the illumination arms 23 in a rotatable manner.

In this embodiment, the document illumination unit 22 is rotatable about the rotary shafts 25 in directions G and H in FIG. 9, and hence the direction in which light is projected from the document illumination unit 22 can be adjusted.

Also, the illumination arms 23 are rotatable about the rotary shafts 24 in directions E and F in FIG. 9. It is hence possible to adjust the distance between the document resting surface 2 and the document illumination unit 22, i.e., to adjust the luminous intensity at the document resting surface 2 illuminated by the document illumination unit 22.

An image pickup unit 26 is disposed such that it can be fitted into a penetration hole 5b formed in the movable holding unit 5. The image pickup unit 26 has a photographing lens 8, and incorporates an image pickup device (not shown), such as a CCD, and an image pickup control circuit 17. Also, as with the first embodiment, the image pickup unit 26 is rotatably held on the movable holding unit 5 by a pair of rotary shafts 10 extending substantially parallel to the document resting surface 2.

The rotary shafts 6, 10, 12, 24 and 25 are disposed to lie substantially parallel to each other.

Numeral 27 denotes an electrical signal line for electrically connecting the main control circuit 15 and the image pickup control circuit 17, and numeral 28 denotes an electrical signal line for electrically connecting the main control circuit 15 and the document illumination unit 22.

As with the first embodiment, the image inputting device of this second embodiment includes a locking mechanism (not shown) for fixedly locking the movable holding unit 5 relative to the document stage unit 1 in both the photographing state and the collapsed state (folded-up state), and an unlocking mechanism (not shown) for releasing the movable holding unit 5 from its locked state. Further, the image inputting device includes a locking mechanism (not shown) for fixedly locking the image pickup unit 26 relative to the movable holding unit 5 in both the photographing state and the collapsed state (folded-up state), and an unlocking mechanism (not shown) for releasing the image pickup unit 26 from its locked state. Moreover, the image inputting device includes a locking mechanism (not shown) for fixedly locking the mirror unit 11 relative to the movable holding unit 5 in both the photographing state and the collapsed state, and an unlocking mechanism (not shown) for releasing the mirror unit 11 from its locked state.

The image inputting device having the above-described construction is set to the photographing state, as shown in FIGS. 7 and 9, by unfolding the movable holding unit 5 upward relative to the document stage unit 1, unfolding the image pickup unit 26 rearward relative to the movable holding unit 5, and then unfolding the mirror unit 11 forward relative to the movable holding unit 5. In the resulted photographing state, the light from the document 2a, which is placed on the document resting surface 2 and illuminated by the document illumination unit 22, is introduced to the photographing lens 8 after being reflected by the reflecting mirror 14 and passing through the penetration hole 5b of the movable holding unit 5.

The electrical signal line 27 passes the respective centers of the rotary shafts 6 and 10 or the vicinity thereof for electrical connection between the main control circuit 15 and the image pickup control circuit 17. Also, the electrical signal line 28 passes the respective centers of the rotary shafts 6, 24 and 25 or the vicinity thereof for electrical connection between the main control circuit 15 and the document illumination unit 22.

The operation of the image inputting device in the photographing state is now described. The light from the document 2a placed on the document resting surface 2 is introduced to the photographing lens 8 via the reflecting mirror 14. An electrical signal output from the photoelectric transducer (image pickup device), which is disposed in the image pickup unit 26 at a focused position of the photographing lens 8, is converted to an image signal by the image pickup control circuit 17. Then, the image signal is inverted upside down with a predetermined data array conversion process executed in the image pickup control circuit 17 because the image signal is obtained by picking up the light after being reflected by one reflecting mirror 14. Thereafter, the image signal inverted upside down is sent to the main control circuit 15 in the document stage unit 1 via the electrical signal line 27.

Note that the process of converting the image signal upside down corresponding to the image inversion by the reflecting mirror may be executed in any other circuit, e.g., the main control circuit 15, than the image pickup control circuit 17.

The image signal inverted upside down is output from the main control circuit 15 to an image display (not shown), such as a projector, which is electrically connected to the image inputting device, through the electrical signal line 19 and the contact unit 16. Also, the image signal is transmitted to the display panel 13 through the electrical signal line 21, whereby the picked-up image is displayed on the display panel 13.

Since the display panel 13 is disposed on the front surface (i.e., surface opposed to the back surface on which the reflecting mirror 14 is disposed) of the mirror unit 11, a user operating the image inputting device is able to replace the document 2a from the side of the control panel 3 and to manipulate the control panel 3. Further, the user is able to look at the contents displayed on the display panel 13 from the side of the control panel 3.

The contents displayed on the display panel 13 are not limited to images picked up by the image pickup unit 26. For example, a test pattern for checking the quality, such as contrast and hue, of an image output to the exterior may also be displayed on the display panel 13.

Since the display panel 13 is disposed on the mirror unit 11, there is no need of providing a holding member dedicated for the display panel 13 separately from the mirror unit 11. As a result, the construction of the image inputting device is simplified correspondingly.

In this second embodiment, unlike the first embodiment, the document illumination unit 22 is adjustably provided independently of the image pickup unit 26. When it is desired to illuminate the document resting surface 2 with a higher luminous intensity, the illumination arms 23 are rotated in a direction of an arrow E in FIG. 9 so that the document illumination unit 22 illuminates the document from a position closer to the document resting surface 2 of the document stage unit 1. Conditions of the document illumination unit 22 and the illumination arms 23 at this time are denoted by a dotted line I in FIG. 9.

Also, by rotating the document illumination unit 22 in direction of an arrow G or H in FIG. 9, the direction of the light projecting surface 22a is adjusted for proper illumination.

When placing a three-dimensional object on the document resting surface 2 and photographing it, the illumination arms 23 are similarly rotated in the direction of the arrow E in FIG. 9 to the position denoted by the chain line I in FIG. 9, for example, so that the three-dimensional object is illuminated from a position as close as possible to that right above. With such an arrangement, the shadow of the three-dimensional object generated upon the illumination from the document illumination unit 22 and an image of the three-dimensional object can be obtained with a less awkward feel.

Further, by rotating the document illumination unit 22 in the direction of the arrow G or H in FIG. 9 and adjusting the direction of the light projecting surface 22a, more proper illumination of the three-dimensional object can be realized.

When the image inputting device of this embodiment is in the state of photographing the document 2a having a gloss, such as a photo, the document illumination unit 22 is preferably arranged, as shown in FIG. 9, such that it obliquely directly illuminates the document resting surface 2 from the outer side (side farther away from the optical axis 8b) of the light 8e without intermediation of the reflecting mirror 14. With that arrangement, a light flux forming a light source image of the document illumination unit 22 will not enter the photographing lens 8. Hence, the light source image of the document illumination unit 22 is surely prevented from being superimposed on the image of the document 2a. In this case, more proper illumination of the document can also be realized by rotating the document illumination unit 22 in the direction of the arrow G or H in FIG. 9 and adjusting the direction of the light projecting surface 22a.

Thus, with this second embodiment, since the position of the document illumination unit 22 and the direction of the light projecting surface 22a can be adjusted independently of the image pickup unit 26, better illumination than that in the first embodiment can be realized for various kinds of objects to be photographed, including a three-dimensional object.

Also, with this second embodiment, since the document illumination unit 22 is located on the side opposed to the control panel 3, a relatively large space is left on the control panel 3 side and the document illumination unit 22 is kept from imposing a physical obstacle when the document 2a is replaced or when the control panel 3 is manipulated. In other word, the user operating the image inputting device can replace the document 2a and manipulate the control panel 3 without interfering with the document illumination unit 22.

Further, since the document illumination unit 22 directly illuminates the document resting surface 2 from an obliquely upward position without intermediation of the reflecting mirror 14, the light from the document illumination unit 22 as the light source (i.e., the light projecting surface 22a) is prevented from directly entering the user's eyes. Therefore, the user can operate the image inputting device without feeling dazzled.

The operation of shifting the image inputting device from the photographing state to the collapsed state (folded-up state) will be described below. First, when the image inputting device is in the photographing state shown in FIGS. 7 and 9, the unlocking mechanism (not shown) for the image pickup unit 26 is operated to release the image pickup unit 26 from the locked state, and the image pickup unit 26 is rotated in a direction of an arrow A in FIG. 9 to be accommodated in the movable holding unit 5 such that the optical axis of the image pickup unit 26 is positioned substantially parallel to the movable holding unit 5. Then, the image pickup unit 26 is locked again with the locking mechanism (not shown) relative to the movable holding unit 5.

In that condition, the photographing lens 8 is positioned in the penetration hole 5b serving as an accommodating space and is covered with the movable holding unit 5. Therefore, when the image inputting device is in the collapsed state, the photographing lens 8 can be protected with no need of fitting a lens protective member, such as a lens cap, to the photographing lens 8.

Then, the unlocking mechanism (not shown) for the mirror unit 11 is operated to release the mirror unit 11 from the locked state, and the mirror unit 11 is rotated in a direction of an arrow B in FIG. 9 to be accommodated in the recess 5a, serving as an accommodating space, of the movable holding unit 5. At this time, the mirror unit 11 is positioned substantially parallel to the movable holding unit 5. Thereafter, the mirror unit 11 is locked again with the locking mechanism (not shown) relative to the movable holding unit 5.

Further, by rotating the document illumination unit 22 (illumination arms 23) in the direction of the arrow E in FIG. 9, the document illumination unit 22 is collapsed relative to the movable holding unit 5 such that the illumination arms 23 are positioned substantially parallel to the movable holding unit 5. A resulting condition is shown in FIG. 10.

In addition, the unlocking mechanism (not shown) for the movable holding unit 5 is operated to release the movable holding unit 5 from the locked state, and the movable holding unit 5 is rotated in a direction of an arrow C in FIG. 10 to be folded relative to the document stage unit 1 until reaching a position where the movable holding unit 5 is substantially parallel to the document stage unit 1. Then, the movable holding unit 5 is locked again with the locking mechanism (not shown) relative to the document stage unit 1.

As seen from FIGS. 10 and 11, in the collapsed state thus obtained, a part of the mirror unit 11 overlaps with a part of the image pickup unit 26 in a thickness direction of both the movable holding unit 5 and the document stage unit 1.

In the collapsed state, therefore, the image pickup unit 26 and the mirror unit 11 can be folded up relative to the movable holding unit 5 and the document stage unit 1 into a compact size without interfering with each other.

Also, the reflecting mirror 14 is covered with one surface of the movable holding unit 5 corresponding to the bottom surface (ceiling surface in the condition of FIG. 11) of the recess 5a formed in the movable holding unit 5, and the display panel 13 is positioned in a closely opposing relation to the upper surface of the document stage unit 1. Accordingly, when the image inputting device is in the collapsed state, the reflecting mirror 14 and the display panel 13 can be protected with no need of fitting a protective member, e.g., a protective cover, to the mirror unit 11 (i.e., the reflecting mirror 14 and the display panel 13).

Further, in the collapsed state, the document illumination unit 22 is also folded up such that the light projecting surface 22a is positioned in a closely opposing relation to the upper surface of the document stage unit 1. Accordingly, the document illumination unit 22 can be protected with no need of fitting a protective member, e.g., a protective cover, to it.

Moreover, the upper surface of the control panel 3 is covered with the movable holding unit 5 and the mirror unit 11 which are folded up relative to the document stage unit 1. Accordingly, the control panel 3 can also be protected with no need of fitting a protective member, e.g., a protective cover, to it.

In addition, the upper surface of the document stage unit 1 is covered at its three outer peripheries, i.e., front, left and right ones, with the movable holding unit 5. Therefore, the image inputting device has such a structure in the collapsed state that the document resting surface 2 is less susceptible to damage upon being hit by things or to contamination.

The operation of shifting the image inputting device from the collapsed state to the photographing state is carried out by reversing the above-described operation of shifting the image inputting device from the photographing state to the collapsed state.

Thus, when the image inputting device is in the collapsed state, the movable holding unit 5 functions as a protective member for protecting the photographing lens 8, the document illumination unit 22 (in particular the light projecting surface 22a), the mirror unit 11, the display panel 13 and the control panel 3, i.e., components which have in general a relatively low mechanical strength. Accordingly, there is no need of fitting protective members dedicated for the photographing lens 8, the document illumination unit 22, the mirror unit 11, the display panel 13 and the control panel 3. Hence, the number of parts required for the image inputting device in the collapsed state can be reduced. Additionally, as shown in FIGS. 8 and 11, the image inputting device of this embodiment has an integrally overlapped and robust structure in the collapsed state as a whole. As a result, an image inputting device with a high mechanical strength and high reliability can be provided.

Further, in this embodiment, the movable holding unit 5 is rotatably supported by the document stage unit 1 through the rotary shafts 6, and the image pickup unit 26, the mirror unit 11, the illumination arms 23 and the document illumination unit 22 are rotatably supported by the movable holding unit 5 through the rotary shafts 10, 12, 24 and 25, respectively. Accordingly, there is no need of leaving the electrical signal lines in a loosely slacked condition near engaging portions of the adjacent component units unlike the conventional case using a telescoping mechanism.

Moreover, during the step of shifting the image inputting device from the photographing state to the collapsed state and the step of shifting it from the collapsed state to the photographing state, the electrical signal lines 21, 27 and 28 are kept from displacing far away from the vicinity of the rotary shafts 6, 10, 12, 24 and 25. Accordingly, the possibility of breakage and connection failures of the electrical signal lines 21, 27 and 28 is greatly reduced, and the reliability of the image inputting device can be increased.

Since the rotary shafts 6, 10, 12, 24 and 25 are disposed substantially parallel to each other, the image inputting device can be shifted between the photographing state and the collapsed state by rotating the movable holding unit 5, the image pickup unit 26, the mirror unit 11 and the document illumination unit 22 in the same plane of rotation. Therefore, the rotating directions of the respective component units are consistent and the operability of the image inputting device can be improved.

FIG. 8 shows a condition in which the handle 4 provided adjacent to the control panel 3 is withdrawn in the collapsed state of the image inputting device shown in FIG. 11. Thus, with the provision of the handle 4 adjacent to the control panel 3 in the image inputting device of this embodiment, the user can easily carry the image inputting device by gripping the handle 4 withdrawn as shown in FIG. 8.

This second embodiment may be modified such that at least the image pickup unit 26 and the mirror unit 11 are rotated in a linked manner relative to the movable holding unit 5 using a linkage mechanism such as a timing belt. With this modification, the locking mechanism and the unlocking mechanism for locking and unlocking the image pickup unit 26 and the mirror unit 11 relative to the movable holding unit 5 can be provided in common. Also, since the image pickup unit 26 and the mirror unit 11 are rotated (unfolded and collapsed) together at the same time, the operation of shifting the image inputting device from the photographing state to the collapsed state and the operation of shifting it from the collapsed state to the photographing state are more simplified and an error in the operating procedure is less likely to occur. Consequently, the operability of the image inputting device can be further improved.

As an alternative, by linking not only the rotations of the image pickup unit 26 and the mirror unit 11, but also the rotation of the movable holding unit 5 relative to the document stage unit 1, the locking mechanism and the unlocking mechanism for locking and unlocking the image pickup unit 26, the mirror unit 11 and the movable holding unit 5 can be provided in common. Consequently, the operability of the image inputting device can be even further improved.

Third Embodiment

A third embodiment of the present invention will be described below with reference to FIGS. 12 to 16.

Figure 12:
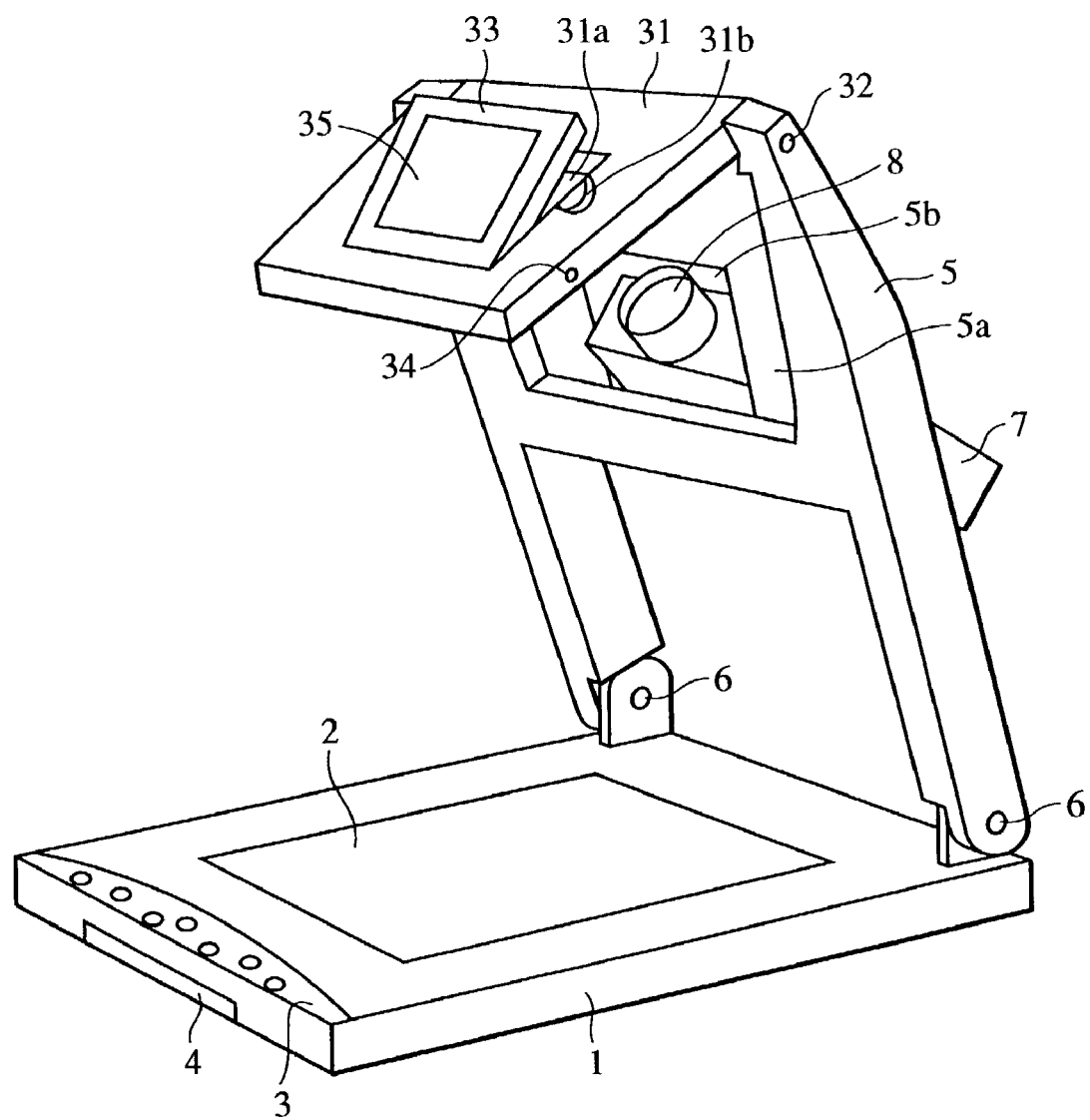
FIG. 12 is a perspective view of an image inputting device according to a third embodiment of the present invention in its photographing state.
Figure 13:
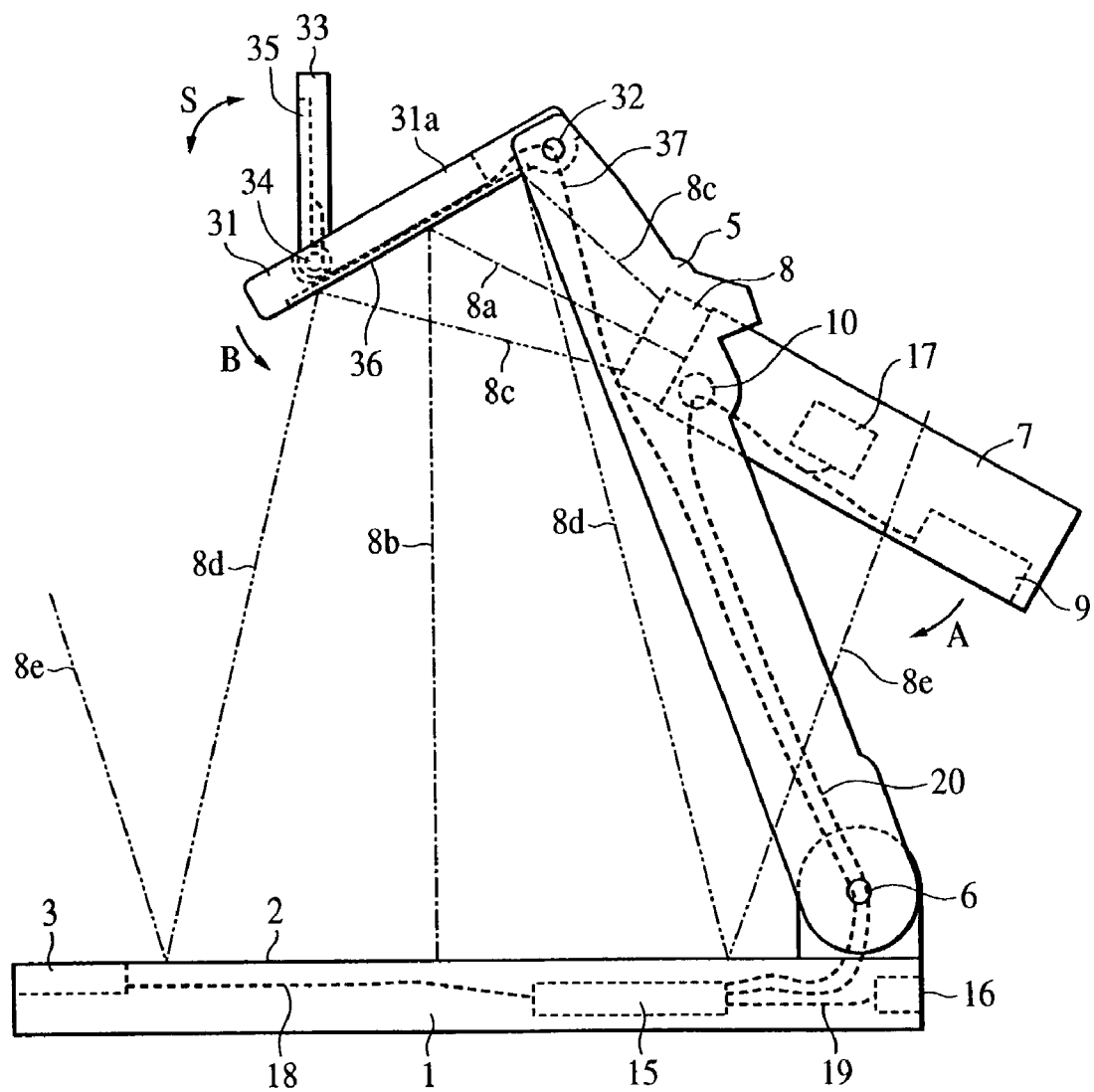
FIG. 13 is a side view of the image inputting device according to the third embodiment in the photographing state.
Figure 14:
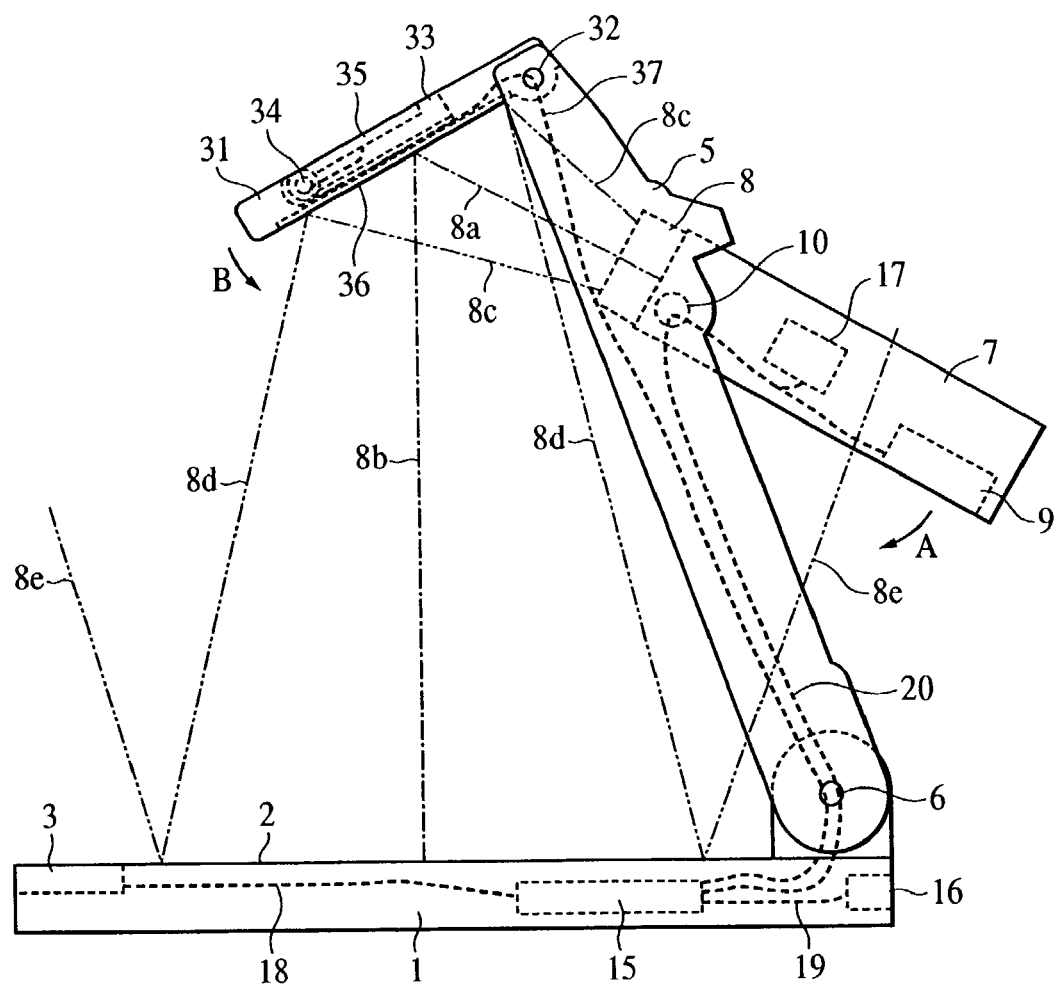
FIG. 14 is a side view of the image inputting device according to the third embodiment in the photographing state.
Figure 15:
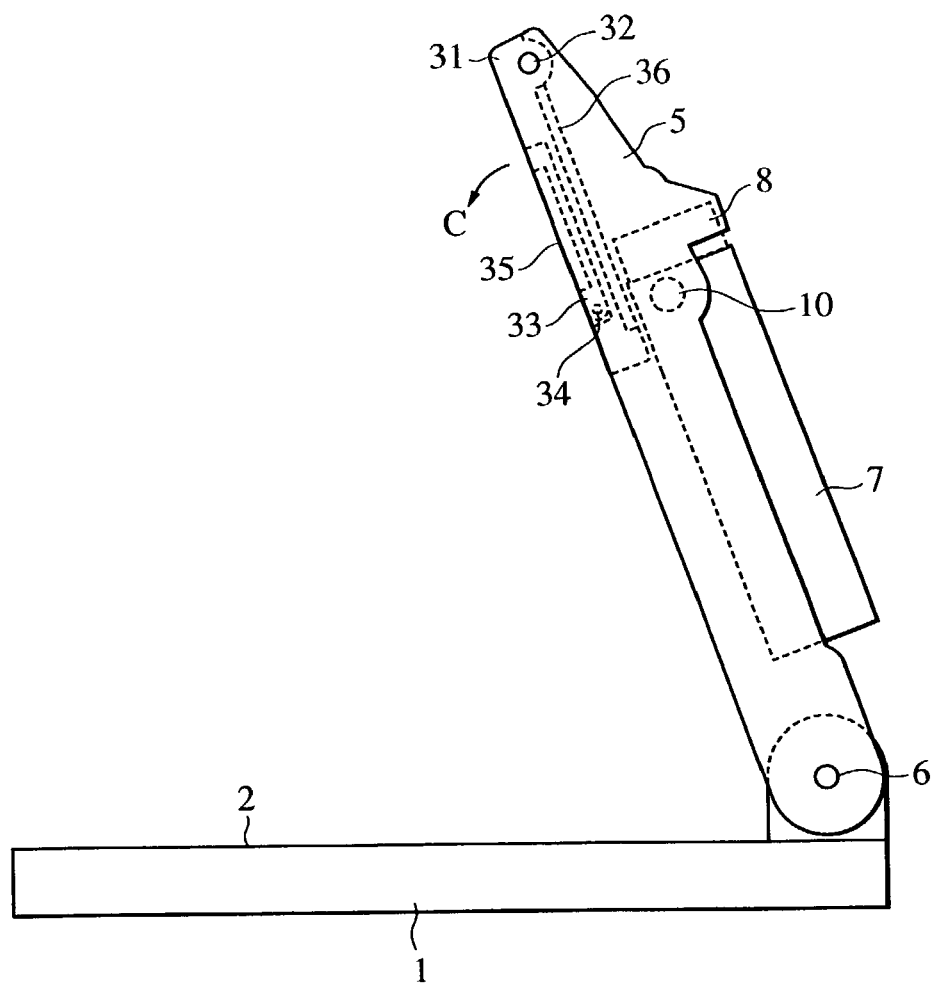
FIG. 15 is a side view of the image inputting device according to the third embodiment during a shift from the photographing state to a collapsed state.
Figure 16:
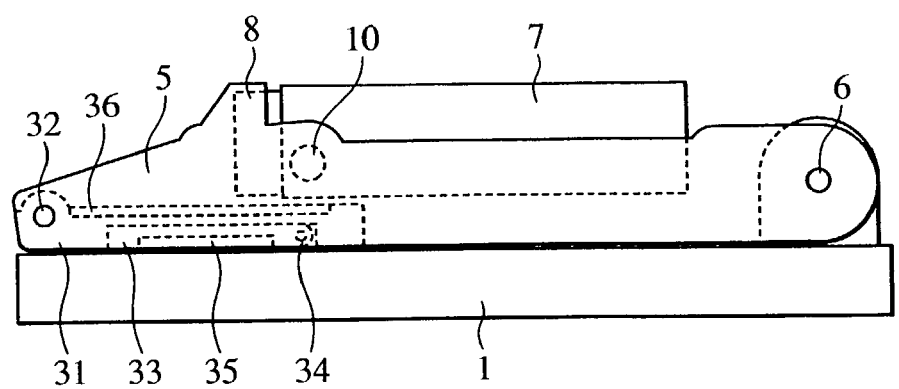
FIG. 16 is a side view of the image inputting device according to the third embodiment in the collapsed state.
Figure 17:
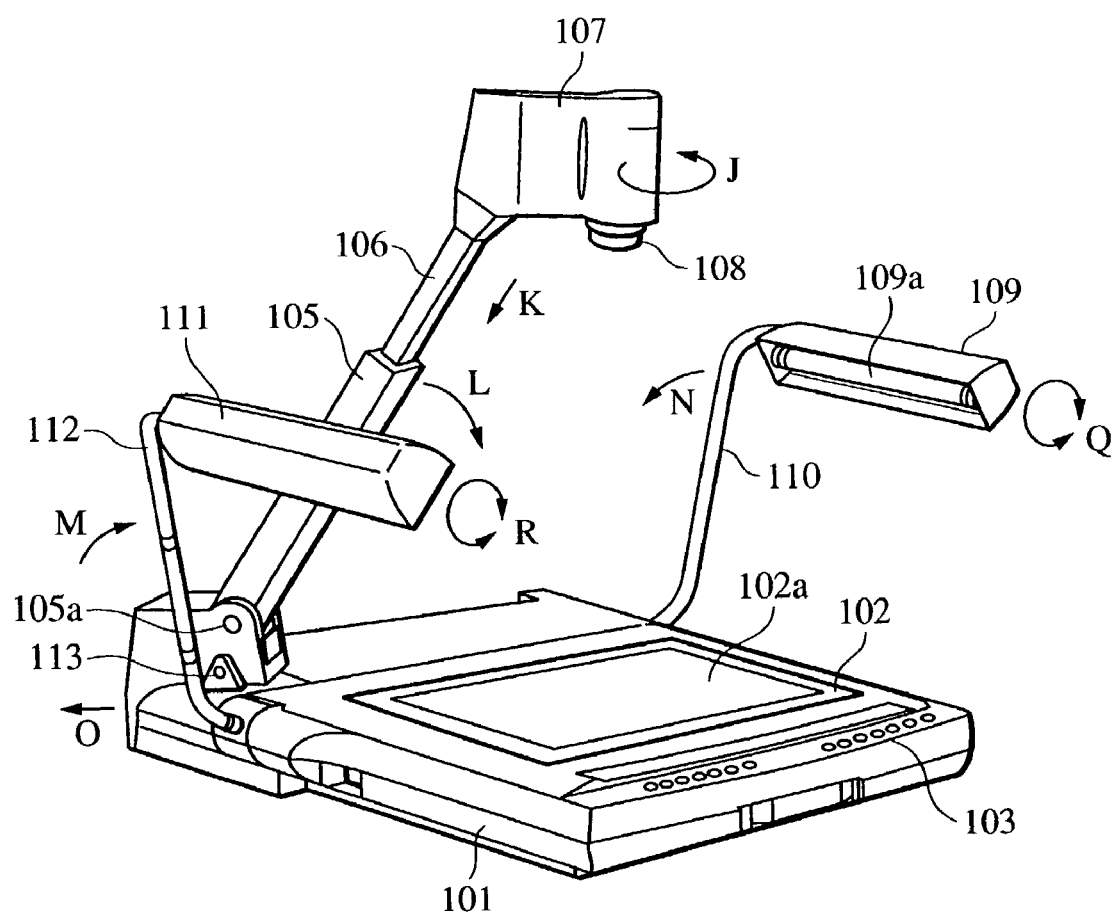
FIG. 17 is a perspective view of a conventional image inputting device in its photographing state.
Figure 18:
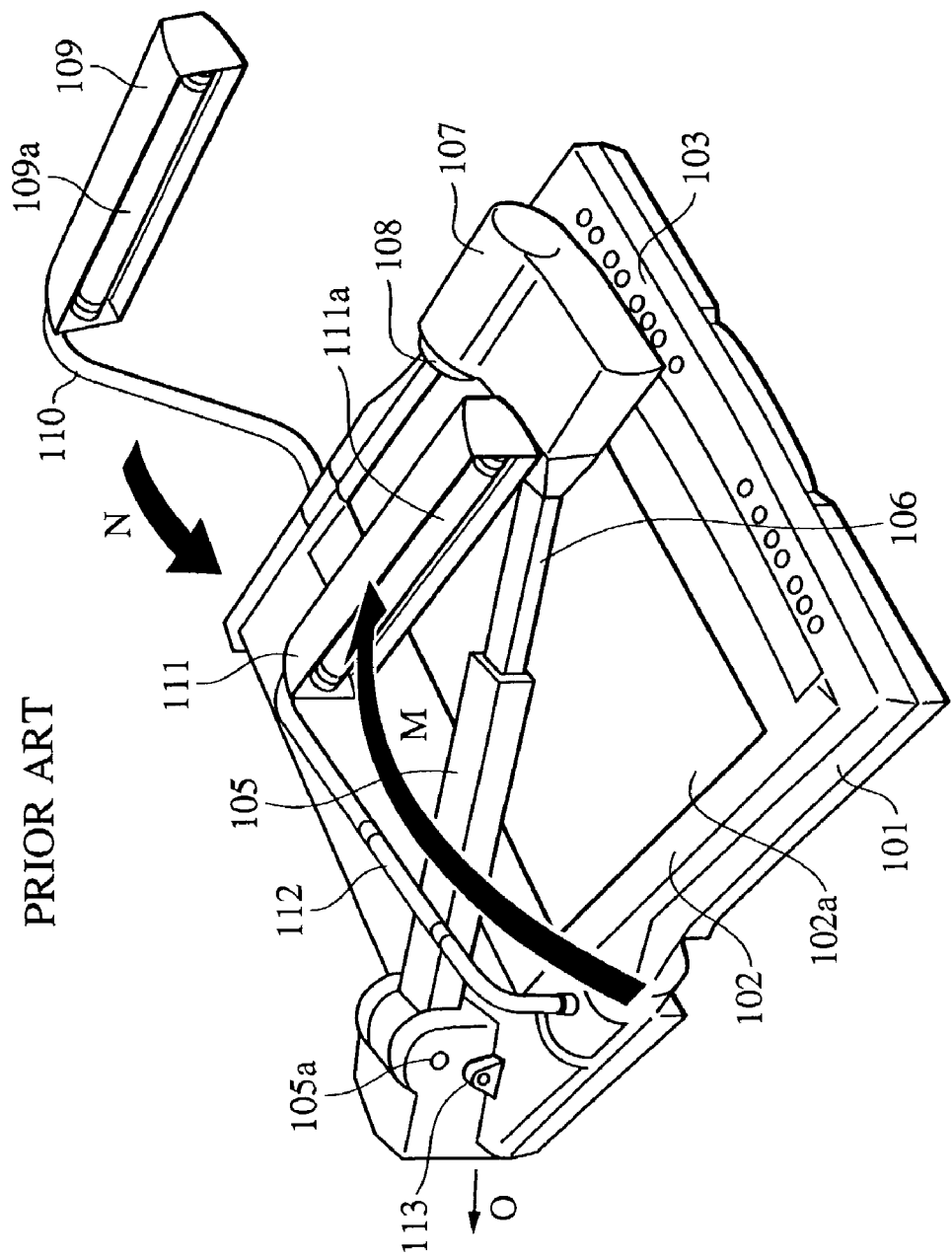
FIG. 18 is a side view of the conventional image inputting device during a shift from the photographing state to a collapsed state.

FIG. 12 is a perspective view of an image inputting device (document camera) according to a third embodiment of the present invention in its photographing state. FIGS. 13 and 14 are side views of the image inputting device of FIG. 12 in the photographing state. FIG. 15 is a side view of the image inputting device of FIG. 12 during a shift from the photographing state to a collapsed state (folded-up state). FIG. 16 is a side view of the image inputting device of FIG. 13 in the collapsed state (folded-up state).

A perspective view of the image inputting device of FIG. 12 in the collapsed state (folded-up state) is the same as that shown in FIG. 2 representing the first embodiment, and hence it is omitted here.

Note that, in this third embodiment described with reference to FIGS. 12 to 16, components in common to the first embodiment described above with reference to FIGS. 1 to 6 are denoted by the same symbols as those in the first embodiment, and a description of those components is omitted here.

Referring to FIGS. 12 to 16, a mirror unit 31 has a recess (accommodating space) 31a and a notch 31b formed on one surface thereof. A pair of rotary shafts 32 are provided on the mirror unit 31 to lie parallel to a document resting surface 2 of a document stage unit 1. The mirror unit 31 is rotatably held on a movable holding unit 5 by the rotary shafts 32. A pair of rotary shafts 34 are provided on a display unit 33 to lie parallel to the document resting surface 2 of the document stage unit 1. A display panel 35 is constituted as a flat display made up of liquid crystal display devices, etc. The display panel 35 displays, e.g., an image picked up by an image pickup unit 7 and a menu screen for operation of the image inputting device. The contents displayed on the display panel 35 are switched over with manipulation made on a control panel 3 in an electrical manner. The display unit 33 is rotatable about the rotary shafts 34 in a direction of an arrow S in FIG. 13. Therefore, a user operating the image inputting device can rotate the display unit 33 in the direction of the arrow S in FIG. 13 and adjust an angle of the display panel 35 so as to provide better viewing to the user. Also, it is possible to accommodate the display unit 33 in the recess (accommodating space) 31a formed in the mirror unit 31 (FIG. 14 shows a condition in which the display unit 33 is accommodated in the recess 31a of the mirror unit 31). A reflecting mirror 36 is disposed on a back surface of the mirror unit 31 (i.e., the other surface of the mirror unit 31 opposed to one surface in which the display unit 33 is disposed), and reflects a light propagating along an optical axis 8b from the document resting surface 2 of the document stage unit 1 to be introduced to a photographing lens 8. An electrical signal line 37 for electrically connecting a main control circuit 15 and the display panel 35 passes the respective centers of the rotary shafts 6, 32 and 34 or the vicinity thereof for electrical connection between the main control circuit 15 and the display panel 35.

As with the first embodiment, the image inputting device of this third embodiment includes a locking mechanism (not shown) for fixedly locking the movable holding unit 5 relative to the document stage unit 1 in both the photographing state and the collapsed state (folded-up state), and an unlocking mechanism (not shown) for releasing the movable holding unit 5 from its locked state. Also, the image inputting device includes a locking mechanism (not shown) for fixedly locking the image pickup unit 7 relative to the movable holding unit 5 in both the photographing state and the collapsed state, and an unlocking mechanism (not shown) for releasing the image pickup unit 7 from its locked state. Further, the image inputting device includes a locking mechanism (not shown) for fixedly locking the mirror unit 31 relative to the movable holding unit 5 in both the photographing state and the collapsed state, and an unlocking mechanism (not shown) for releasing the mirror unit 31 from its locked state. The rotary shafts 6, 10, 32 and 34 are arranged parallel to each other.

The operation of the image inputting device in the photographing state is now described. In the photographing state of the image inputting device, the reflecting mirror 36 and the photographing lens 8 are arranged, as shown in FIGS. 12 to 14, such that a light flux 8d from the document resting surface 2 of the document stage unit 1 is reflected by the reflecting mirror 36 and a resulting light flux 8c enters the photographing lens 8. The position of the mirror unit 31 holding the reflecting mirror 36 is decided so as to establish the above optical system. The position of the image pickup unit 7 holding the photographing lens 8 is also decided. A photoelectric transducer (not shown), such as a CCD, is disposed in the image pickup unit 7 at a focused position of the photographing lens 8, and an electrical signal output from the photoelectric transducer is converted to an image signal by an image pickup control circuit 17. Then, the image signal is inverted upside down and sent to the main control circuit 15 in the document stage unit 1 via an electrical signal line 20. The reason why the image signal obtained from the image to be photographed is inverted upside down in the image pickup control circuit 17 in that the light flux 8d from the document resting surface 2 of the document stage unit 1 is introduced to the photographing lens 8 after being reflected once by the reflecting mirror 36. Note that the process of converting the image signal upside down corresponding to the image inversion by the reflecting mirror may be executed in any other circuit, e.g., the main control circuit 15, than the image pickup control circuit 17.

The image signal inverted upside down is output from the main control circuit 15 to an image display (not shown), such as a projector, which is electrically connected to the image inputting device, through an electrical signal line 19 and a contact unit 16. Also, the image signal is transmitted to the display panel 35 through the electrical signal line 37, whereby the picked-up image is displayed on the display panel 35.

The display unit 33 including the display panel 35 is disposed on the front surface (i.e., surface opposed to the back surface on which the reflecting mirror 36 is disposed) of the mirror unit 31 to be rotatable about the rotary shafts 34 such that the display unit 33 can be fixed at any desired angle within its adjustable range by a free stopping mechanism or the like. Therefore, the user operating the image inputting device is able to replace a document from the side of the control panel 3 and to manipulate the control panel 3. Further, the user is able to look at the contents displayed on the display panel 35 from the side of the control panel 3 while adjusting the display unit 33 to such an angle as providing better viewing to the user. The contents displayed on the display panel 35 are not limited to images photographed by the photographing lens 8. For example, a test pattern for checking the quality, such as contrast and hue, of an image output to the exterior may also be displayed on the display panel 35.

With the construction described above, the image inputting device having the display panel 35 with superior viewability to the first embodiment can be provided. Further, as with the first embodiment, the document illumination unit 9 is disposed at the end of the image pickup unit 7 to obliquely directly illuminate the document resting surface 2 of the document stage unit 1 from the outer side (side farther away from the optical axis 8*b*) of the light 8*e* without intermediation of the reflecting mirror 36, as shown in FIGS. 12 to 14, when the image imputing device is in the photographing state. Accordingly, even when the document is a glossy document (reflective one), such as a photo, a light source image of the document illumination unit 9 is surely prevented from being superimposed on the image of the document photographed by the photographing lens 8 (supposing that the document illumination unit 9 is located in the inner side (side closer to the optical axis 8*b*) of the light 8*e*, when the document is a reflective one, the illumination light is reflected by the document and enters the photographing lens 8, whereby a high-quality photograph could not be obtained).

Further, since the document illumination unit 9 is constructed integrally with the image pickup unit 7, there is no need of providing a holding member dedicated for the document illumination unit 9 separately from the image pickup unit 7. As a result, the construction of the image inputting device can be further simplified. Moreover, the electrical signal line extended from the main control circuit 15 to the document illumination unit 9 and the electrical signal line extended from the main control circuit 15 to the image pickup control circuit 17 can be wired as a common line. Still further, since the document illumination unit 9 is located on the side opposed to the control panel 3, a relatively large space is left on the control panel 3 side and the document illumination unit 9 is kept from imposing a physical obstacle when the document is replaced or when the control panel 3 is manipulated. In other words, the user operating the image inputting device can not only replace the document, but also manipulate the control panel 3 for instructing the start and end of photographing of the document by the image pickup unit 7, turning-on and -off of the document illumination unit 9, turning-on and -off of the display panel 33, etc. without interfering with the document illumination unit 9. Additionally, since the document illumination unit 9 directly illuminates the document resting surface 2 of the document stage unit 1 from an obliquely upward position without intermediation of the reflecting mirror 36, the light from the document illumination unit 9 as the light source is prevented from directly entering the user's eyes. Therefore, the user can operate the image inputting device without feeling dazzled.

The operation of shifting the image inputting device from the photographing state to the collapsed state (folded-up state) will be described below. When the image inputting device is in the photographing state shown in FIGS. 12 and 13, the display unit 33 is rotated in the direction of the arrow S in FIG. 13 to be accommodated in the recess 31*a* of the mirror unit 31. A resulting condition is shown in FIG. 14. Then, in the condition of FIG. 14, the unlocking mechanism (not shown) for the image pickup unit 7 is operated to release the image pickup unit 7 from the locked state, and the image pickup unit 7 is rotated in a direction of an arrow A in FIG. 13 to be accommodated in the movable holding unit 5. Then, the image pickup unit 7 is locked again with the locking mechanism (not shown) when the image pickup unit 7 is positioned parallel to the movable holding unit 5 (namely, the image pickup unit 7 is brought into the collapsed position thereof). In this condition, the photographing lens 8 is positioned in the penetration hole 5*b* and is covered with the movable holding unit 5. Therefore, when the image inputting device is in the collapsed state, the photographing lens 8 can be protected with no need of fitting a lens protective member, such as a lens cap, to the photographing lens 8. As a modification, at least a fore end of the photographing lens 8 may be sealed by the movable holding unit 5 or the mirror unit 31 when the image inputting device is in the collapsed state. That modification provides the advantage that dirt or dust is less liable to adhere the most front surface of the photographing lens 8.

Then, the unlocking mechanism (not shown) for the mirror unit 31 is operated to release the mirror unit 31 from the locked state, and the mirror unit 31 is rotated in a direction of an arrow B in FIG. 13 to be accommodated in the recess 5*a* of the movable holding unit 5. At this time, the mirror unit 31 is positioned substantially parallel to the movable holding unit 5. Thereafter, the mirror unit 31 is locked again with the locking mechanism (not shown). A resulting condition is shown in FIG. 15. In that condition, as shown in FIG. 15, the mirror unit 31 in the collapsed position overlaps with the image pickup unit 7 in the collapsed position. Accordingly, the image pickup unit 7 and the mirror unit 31 occupy a smaller size in the collapsed state. Also, in the condition of FIG. 15, the reflecting mirror 36 is covered with the movable holding unit 5, the reflecting mirror 36 can be protected with no need of fitting a protective member, such as a protective cover, to the mirror unit 31 or the reflecting mirror 36 when the image inputting device is in the collapsed state. As a modification, the reflecting mirror 36 may be sealed by the movable holding unit 5 or the image pickup unit 7 when the image inputting device is in the collapsed state. That modification provides the advantage that dirt or dust is less liable to adhere to the reflecting mirror 36.

Moreover, the unlocking mechanism (not shown) for the movable holding unit 5 is operated to release the movable holding unit 5 from the locked state, and the movable holding unit 5 is rotated in a direction of an arrow C in FIG. 15 to be folded relative to the document stage unit 1 until reaching a position where the movable holding unit 5 is substantially parallel to the document stage unit 1. Then, the movable holding unit 5 is locked again with the locking mechanism (not shown) relative to the document stage unit 1. A resulting condition is shown in FIG. 16. In that condition, as seen from FIG. 16, the document illumination unit 9 and the display panel 35 are positioned in a closely opposing relation to the upper surface of the document stage unit 1. Therefore, when the image inputting device is in the collapsed state, the document illumination unit 9 and the display panel 35 can be protected with no need of fitting lens protective members, such as protective covers, to the document illumination unit 9 and the mirror unit 31 or the display panel 35. In addition, since the document resting surface 2 of the document stage unit 1 is also covered with the movable holding unit 5 in the collapsed state of the image inputting device, dirt or dust is less liable to adhere to the document resting surface 2.

The operation of shifting the image inputting device from the collapsed state to the photographing state is carried out by reversing the above-described operation of shifting the image inputting device from the photographing state to the collapsed state.

In that operation, when withdrawing the display unit 33 out of the recess 31a of the mirror unit 31 from the condition shown in FIG. 14 to that shown in FIG. 12 or 13, the user inserts a finger into the notch 31b of the mirror unit 31 and raises the display unit 33 with the finger.

Thus, when the image inputting device is in the collapsed state, the document stage unit 1 and the movable holding unit 5 function as protective members for protecting the photographing lens 8, the document illumination unit 9, the mirror unit 31 and the display panel 35, i.e., components which have in general a relatively low mechanical strength. Accordingly, there is no need of fitting protective members dedicated for the photographing lens 8, the document illumination unit 9, the mirror unit 31 and the display panel 35. Hence, the image inputting device of this embodiment has an integrally overlapped and robust structure in the collapsed state as a whole. As a result, an image inputting device with a high mechanical strength and high reliability can be provided.

Further, in this embodiment, the movable holding unit 5 is rotatably supported by the document stage unit 1 through the rotary shafts 6, and the image pickup unit 7 and the mirror unit 31 are rotatably supported by the movable holding unit 5 through the rotary shafts 10 and 32, respectively. In addition, the display unit 33 is rotatably supported by the mirror unit 31 through the rotary shafts 34. Moreover, the electrical signal lines 20 and 37 pass the center of the rotary shaft 6 or the vicinity thereof, the electrical signal line 20 passes the center of the rotary shaft 10 or the vicinity thereof, and the electrical signal line 37 passes the respective centers of the rotary shafts 32 and 34 or the vicinity thereof. Accordingly, in the image inputting device of this embodiment, there is no need of leaving the electrical signal lines in a loosely slacked condition near engaging portions of the adjacent component units unlike the conventional case using a telescoping mechanism. Moreover, during the step of shifting the image inputting device from the photographing state to the collapsed state and the step of shifting it from the collapsed state to the photographing state, the electrical signal lines are kept from displacing far away from the vicinity of the rotary shafts. Accordingly, the possibility of breakage and connection failures of the electrical signal lines is greatly reduced, and the reliability of the image inputting device can be increased.

In this third embodiment, since the rotary shafts 6, 10, 32 and 34 are disposed substantially parallel to each other, the image inputting device can be shifted between the photographing state and the collapsed state by rotating the movable holding unit 5, the image pickup unit 7 and the mirror unit 31 in the same plane of rotation. Therefore, the rotating directions of the respective component units are consistent and the operability of the image inputting device can be improved.

This third embodiment may be modified such that at least the image pickup unit 7 and the mirror unit 31 are rotated in a linked manner relative to the movable holding unit 5 using a linkage mechanism such as a timing belt. With this modification, the locking mechanism and the unlocking mechanism for locking and unlocking the image pickup unit 7 and the mirror unit 31 relative to the movable holding unit 5 can be provided in common. Also, since the image pickup unit 7 and the mirror unit 31 are rotated together at the same time, the operation of shifting the image inputting device from the photographing state to the collapsed state and the operation of shifting it from the collapsed state to the photographing state are more simplified and an error in the operating procedure is less likely to occur. Consequently, the operability of the image inputting device can be further improved.

As an alternative, by linking not only the rotations of the image pickup unit 7 and the mirror unit 31, but also the rotation of the movable holding unit 5 relative to the document stage unit 1, the locking mechanism and the unlocking mechanism for locking and unlocking the image pickup unit 7, the mirror unit 31 and the movable holding unit 5 can be provided in common. Consequently, the operability of the image inputting device can be even further improved.

According to the embodiments, as described above, the image inputting device can be entirely shifted from the photographing state to the collapsed state, in which it has an integrally overlapped structure, by folding the image pickup unit and the mirror unit relative to the movable holding unit and then folding the movable holding unit relative to the document stage unit. Hence, the strength (such as impact resistance) and compactness of the image inputting device in the collapsed state can be ensured with no need of dedicated parts for protecting the image pickup unit and the mirror unit.

Since the reflecting mirror included in the mirror unit is disposed to introduce a light from an object to be photographed to the image pickup unit after reflecting the light once, the image pickup unit can be located closer to the document stage unit. Also, since only the minimum number of reflecting mirror is used, an image inputting device being compact not only in the collapsed state but also in the photographing state can be realized.

Also, the compactness of the image inputting device in the collapsed state in the thickness direction thereof can be achieved with such a construction that the movable holding unit is folded to be substantially parallel to the document resting surface of the document stage unit, and that when the movable holding unit is in the folded-up state, the mirror unit folded to be accommodated in the movable holding unit is positioned substantially parallel to the document resting surface of the document stage unit, and the image pickup unit folded to be accommodated in the movable holding unit is positioned with its optical axis extending substantially parallel to the document resting surface of the document stage unit.

Further, the size of the image inputting device in the collapsed state in the direction in which the image pickup unit and the mirror unit are arranged can be reduced with such a construction that the image pickup unit and the mirror unit accommodated in the movable holding unit, which is folded up to lie over the document stage unit, are overlapped in at least parts thereof with each other in the thickness direction of the document stage unit.

With the movable holding unit folded up to lie over the document stage unit in a covering relation to at least three outer peripheries of the upper surface of the document stage unit, the document resting surface of the document stage unit is less subjected to being hit and hence can be protected against damage and contamination.

With the image pickup unit including the illumination unit capable of illuminating the object to be photographed when the image pickup unit is in the unfolded state, the construction of the image inputting device can be simplified in comparison with the case employing a dedicated member for holding the illumination unit in a foldable manner.

In this connection, by arranging the illumination unit so as to illuminate the object to be photographed from the outer side of an outermost light of a light flux that is incident upon and reflected by the document resting surface of the document stage unit and then introduced to the image pickup unit after being reflected by the reflecting mirror, an image of the illumination unit is prevented from being superimposed on a photographed image and a high-quality photographed image can be obtained.

Additionally, when the document stage unit includes a control panel for instructing the operation of the image inputting device, the control panel is disposed to be covered with the image pickup unit or -the mirror unit which is folded up relative to the document stage unit. With that arrangement, it is possible in the collapsed state of the image inputting device to prevent the control panel from being hit by things and to protect the control panel against damage, etc. with no need of employing a dedicated protective member for protecting the control panel.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image inputting device comprising:
   a base having an object resting surface on which an object rests;
   an image pickup unit;
   a reflecting unit having a reflecting surface for reflecting a light from the object and introducing the light to said image pickup unit; and
   a holding unit rotatably supported on said base to be rotatable about a first axis parallel to said object resting surface,
   said image pickup unit rotatably supported by said holding unit to be rotatable about a second axis, and
   said reflecting unit rotatably supported by said holding unit to be rotatable about a third axis.

2. An image inputting device according to claim 1, wherein said second axis and said third axis are parallel to each other.

3. An image inputting device according to claim 1, wherein said first axis, said second axis and said third axis are parallel to each other.

4. An image inputting device according to claim 1, wherein said holding unit has a first holding space for holding said reflecting unit, and
   when said holding unit is rotated to be substantially parallel to said object resting surface of said base with said reflecting unit held in the first holding space of said holding unit, said reflecting unit is positioned substantially parallel to said object resting surface.

5. An image inputting device according to claim 1, wherein said holding unit has a second holding space for holding said image pickup unit, and
   when said holding unit is rotated to be substantially parallel to said object resting surface of said base with said image pickup unit held in the second holding space of said holding unit, an optical axis of said image pickup unit is positioned substantially parallel to said object resting surface.

6. An image inputting device according to claim 1, wherein said image pickup unit includes an illumination section for illuminating said object resting surface.

7. An image inputting device according to claim 6, wherein said illumination section illuminates said object resting surface from an outer side of an outermost light of a light flux that is incident upon and reflected by said object resting surface and then introduced to said image pickup unit after being reflected by said reflecting surface.

8. An image inputting device according to claim 1, further comprising an illumination unit for illuminating said object resting surface,
   wherein said illumination unit is rotatably supported on said holding unit to be rotatable about a fourth axis.

9. An image inputting device according to claim 8, wherein said fourth axis is parallel to said first axis.

10. An image inputting device according to claim 1, further comprising a flat display,
    wherein said flat display is fixed integrally with said reflecting unit.

11. An image inputting device according to claim 1, further comprising a flat display,
    wherein said flat display is rotatably supported on said reflecting unit to be rotatable about a fifth axis.

12. An image inputting device according to claim 1, further comprising a control panel disposed on said base for operating said image inputting device,
    wherein said control panel is covered with said holding unit when said holding unit is rotated to be substantially parallel to said object resting surface of said base.

13. An image inputting device comprising:
    a base having an object resting surface on which an objects rests;
    an image pickup unit;
    a reflecting unit having a reflecting surface for reflecting a light from the object and introducing the light to said image pickup unit, and
    holding means rotatably supported on said base to be rotatable about a first axis parallel to said object resting surface,
    wherein said image pickup unit is rotatably supported on said holding means to be rotatable about a second axis, and said reflecting unit is rotatably supported by said holding means to be rotatable about a third axis.

14. An image inputting device according to claim 13, wherein said second axis and said third axis are parallel to each other.

15. An image inputting device according to claim 13, wherein said first axis, said second axis, and said third axis are parallel to each other.

* * * * *

UNITED STATES PATENT AND TRADEMARK OFFICE
CERTIFICATE OF CORRECTION

PATENT NO.         : 7,050,106 B2
APPLICATION NO. : 10/285433
DATED              : May 23, 2006
INVENTOR(S)        : Masatoshi Nagano It is certified that error appears in the above-identified patent and that said Letters Patent is hereby corrected as shown below:

On Title Page item [56] REFERENCES CITED:

FOREIGN PATENT DOCUMENTS, "JP   63240177   10/1988" should read --JP   63-240177   10/1988--, and "JP   08135894   5/1996" should read --JP   8-135894   5/1996--.

Signed and Sealed this

Twenty-fourth Day of July, 2007

JON W. DUDAS
*Director of the United States Patent and Trademark Office*